US012603068B2

(12) United States Patent
Dong et al.

(10) Patent No.: US 12,603,068 B2
(45) Date of Patent: Apr. 14, 2026

(54) SCREEN BRIGHTNESS ADJUSTMENT METHOD, ELECTRONIC DEVICE, AND COMPUTER-READABLE STORAGE MEDIUM

(71) Applicant: Honor Device Co., Ltd., Shenzhen (CN)

(72) Inventors: Shuanzhu Dong, Shenzhen (CN); Zhe Li, Shenzhen (CN); Libin Sun, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 69 days.

(21) Appl. No.: 18/687,043

(22) PCT Filed: May 6, 2023

(86) PCT No.: PCT/CN2023/092545
§ 371 (c)(1),
(2) Date: Jan. 16, 2025

(87) PCT Pub. No.: WO2023/231703
PCT Pub. Date: Dec. 7, 2023

(65) Prior Publication Data

US 2025/0149009 A1 May 8, 2025

(30) Foreign Application Priority Data

May 30, 2022 (CN) ........................ 202210602881.9

(51) Int. Cl.
*G09G 5/10* (2006.01)
*G09G 3/282* (2006.01)

(52) U.S. Cl.
CPC ............... *G09G 5/10* (2013.01); *G09G 3/282* (2013.01); *G09G 2320/0626* (2013.01)

(58) Field of Classification Search
CPC ........ G09G 5/10; G09G 3/282; G09G 3/3406; G09G 2320/0626; G09G 2340/0435;
(Continued)

(56) References Cited

U.S. PATENT DOCUMENTS

| | | | | |
|---|---|---|---|---|
| 7,280,103 | B2 * | 10/2007 | Taoka | G09G 3/20 345/98 |
| 11,600,236 | B2 * | 3/2023 | Yoshida | G09G 3/3611 |

(Continued)

FOREIGN PATENT DOCUMENTS

| | | |
|---|---|---|
| CN | 101902861 A | 12/2010 |
| CN | 101938877 A | 1/2011 |

(Continued)

*Primary Examiner* — Olga V Merkoulova
(74) *Attorney, Agent, or Firm* — Leydig, Voit & Mayer, Ltd.

(57) ABSTRACT

Disclosed are a screen brightness adjustment method and an electronic device. The screen brightness adjustment method is applied to a first electronic device. The first electronic device obtains control information corresponding to a to-be-displayed picture frame, where the to-be-displayed picture frame is a kth picture frame obtained after it is detected that the dimming mode switching occurs, and 1≤k≤M. Screen brightness indicated by the control information corresponding to the to-be-displayed picture frame is lower than first screen ideal brightness, and the first screen ideal brightness is a preset brightness threshold that triggers the first electronic device to perform the dimming mode switching. When displaying the to-be-displayed picture frame, the first electronic device adjusts screen brightness of the first electronic device to the screen brightness indicated by the control information corresponding to the to-be-displayed picture frame.

19 Claims, 14 Drawing Sheets

(58) Field of Classification Search
CPC ....... G09G 2360/16; G09G 2320/0653; G09G 2320/064
See application file for complete search history.

(56) References Cited

U.S. PATENT DOCUMENTS

| | | | | |
|---|---|---|---|---|
| 2004/0155847 | A1* | 8/2004 | Taoka | G09G 3/2081 345/87 |
| 2012/0019160 | A1* | 1/2012 | Lee | H05B 45/10 315/291 |
| 2020/0111448 | A1* | 4/2020 | Wang | G09G 3/2081 |
| 2022/0262304 | A1* | 8/2022 | Fan | G09G 3/3208 |

FOREIGN PATENT DOCUMENTS

| | | | | | |
|---|---|---|---|---|---|
| CN | 203788378 | U | * | 8/2014 | |
| CN | 106713640 | A | | 5/2017 | |
| CN | 107665694 | A | | 2/2018 | |
| CN | 108806620 | A | | 11/2018 | |
| CN | 109859721 | A | * | 6/2019 | |
| CN | 109951594 | A | | 6/2019 | |
| CN | 109951595 | A | | 6/2019 | |
| CN | 110164368 | A | | 8/2019 | |
| CN | 111599296 | A | | 8/2020 | |
| CN | 112309321 | A | | 2/2021 | |
| CN | 111508434 | B | | 4/2021 | |
| CN | 113096578 | A | | 7/2021 | |
| CN | 113192464 | A | | 7/2021 | |
| CN | 111798813 | B | | 1/2022 | |
| CN | 113903299 | A | | 1/2022 | |
| CN | 111599296 | B | * | 9/2022 | G09G 3/00 |
| KR | 1020160076614 | A | | 7/2016 | |
| WO | 2006095743 | A1 | | 9/2006 | |
| WO | 2018159317 | A1 | | 9/2018 | |
| WO | WO-2020192362 | A1 | * | 10/2020 | G09G 3/3208 |
| WO | 2021143248 | A1 | | 7/2021 | |

* cited by examiner

SCREEN BRIGHTNESS ADJUSTMENT METHOD, ELECTRONIC DEVICE, AND COMPUTER-READABLE STORAGE MEDIUM

CROSS-REFERENCE TO RELATED APPLICATIONS

This application is a National Stage of International Application No. PCT/CN2023/092545, filed on May 6, 2023, which claims priority to Chinese Patent Application No. 202210602881.9, filed on May 30, 2022, both of which are hereby incorporated by reference in their entireties.

TECHNICAL FIELD

This application relates to the field of display technologies, and in particular, to a screen brightness adjustment method, an electronic device, and a computer-readable storage medium.

BACKGROUND

In an actual use process of an electronic device with a display, such as a mobile phone, a brightness adjustment scenario is involved. For example, in a process in which external ambient light changes, to view a displayed picture on a screen more clearly and comfortably, a user may manually adjust screen brightness, or the screen automatically adjusts brightness. In a brightness adjustment scenario, a dimming mode of the electronic device includes switching from a pulse width modulation (PWM) mode to a direct current (DC) mode or switching from the DC mode to the PWM mode.

A brightness jump visible to naked eyes occurs on the screen of the electronic device when the electronic device performs dimming mode switching. Consequently, visual perception of the user is greatly affected.

SUMMARY

Embodiments of this application provide a screen brightness adjustment method, an electronic device, and a computer-readable storage medium, to resolve a problem that a brightness jump visible to naked eyes occurs on a screen of the electronic device when the electronic device performs dimming mode switching, thereby improving visual perception of a user.

To achieve the foregoing objective, the following technical solutions are used in the embodiments of this application:

According to a first aspect, a screen brightness adjustment method is provided, and is applied to a first electronic device. The method includes: The first electronic device obtains control information corresponding to a to-be-displayed picture frame, where the to-be-displayed picture frame is a kth picture frame obtained after the first electronic device detects that dimming mode switching occurs, $1 \leq k \leq M$, k is a positive integer, and M is a preset positive integer; the control information corresponding to the to-be-displayed picture frame is used to indicate screen brightness of the first electronic device when the first electronic device displays the to-be-displayed picture frame; the screen brightness indicated by the control information corresponding to the to-be-displayed picture frame is lower than first screen ideal brightness; the first screen ideal brightness is a preset brightness threshold that triggers the first electronic device to perform the dimming mode switching; and the dimming mode switching includes switching from a pulse width modulation PWM mode to a direct current DC mode or switching from the DC mode to the PWM mode; and when displaying the to-be-displayed picture frame, the first electronic device adjusts screen brightness of the first electronic device to the screen brightness indicated by the control information corresponding to the to-be-displayed picture frame.

It should be noted that a brightness jump that occurs when the electronic device performs the dimming mode switching is caused by a hysteresis effect of a thin film transistor (TFT) device. Specifically, an emission (EM) signal in two dimming modes of the PWM mode and the DC mode is completely different in terms of a quantity of pulses or periods and a duty cycle in one frame. Therefore, due to this difference, the electronic device needs to perform time sequence switching and pulse switching for the EM signal when performing the dimming mode switching. It should be noted that a coupling capacitance inside a screen of the electronic device undergoes a transient change when a time sequence and a pulse of the EM signal are transiently switched. However, because the TFT device in a screen drive circuit that performs switching cannot respond instantaneously due to the hysteresis effect, the electronic device has a visual brightness jump problem when the dimming mode switching occurs.

According to the screen brightness adjustment method, jumps may occur in first several picture frames obtained after the first electronic device detects that the dimming mode switching occurs. Therefore, in this embodiment of this application, the screen brightness adjustment method needs to be performed only on the to-be-displayed picture frame of the first electronic device that belongs to these picture frames, to alleviate a brightness jump. When the screen brightness obtained when the to-be-displayed picture frame is displayed is adjusted to be lower than the first screen ideal brightness based on the control information corresponding to the to-be-displayed picture frame, screen jump brightness caused by the thin film transistor (TFT) device is superposed, so that screen actual brightness finally obtained when the first electronic device displays the to-be-displayed picture frame approaches the first screen ideal brightness, thereby alleviating a brightness jump problem.

In some embodiments of this application, a frame quantity of picture frames output by a second electronic device between a first time node and a second time node is M; the first time node is a moment at which screen brightness of the second electronic device starts to jump when the second electronic device detects that the dimming mode switching occurs; and the second time node is a moment at which the screen brightness of the second electronic device stops jumping when the second electronic device detects that the dimming mode switching occurs.

Herein, by determining the frame quantity M of picture frames output by the second electronic device between the first time node and the second time node, a frame quantity of all picture frames in which a brightness jump occurs after the first electronic device detects that the dimming mode switching occurs may be determined. In this way, brightness jumps of the M picture frames can be alleviated according to the screen brightness adjustment method provided in this embodiment of this application.

Specifically, the quantity M of picture frames output by the second electronic device between the first time node and the second time node is obtained based on an equation $M=[(t2-t1)*f_{refresh}]$, where t1 is the first time node; t2 is the second time node; and $f_{refresh}$ is a screen refresh rate of the second electronic device.

In some embodiments of this application, the obtaining control information corresponding to a to-be-displayed picture frame includes: obtaining the control information corresponding to the to-be-displayed picture frame from M pre-stored screen brightness parameters, where each screen brightness parameter includes control information corresponding to one picture frame; and the to-be-displayed picture frame is a picture frame in the M screen brightness parameters.

Considering that the screen refresh rate is relatively high, in this embodiment, the following is pre-stored: control information corresponding to each of first M picture frames obtained after the first electronic device detects that the dimming mode switching occurs. In this way, when the screen brightness adjustment manner is performed, the control information can be directly invoked from the M pre-stored screen brightness parameters. This manner helps reduce adjustment time for each picture frame in which a brightness jump occurs, to avoid freezing of the to-be-displayed picture frame due to excessively long time of obtaining the control information.

In some design manners of this application, the control information is obtained by calculating second screen ideal brightness and second screen actual brightness of the second electronic device when the dimming mode switching occurs; the second screen ideal brightness is a preset brightness threshold that triggers the second electronic device to perform the dimming mode switching; and the second screen actual brightness is an actual brightness value obtained when the second electronic device displays the picture frame; and the screen brightness indicated by the control information in each screen brightness parameter is obtained based on a difference between the second screen ideal brightness and second screen jump brightness; and the second screen jump brightness is a difference between the second screen actual brightness and the second screen ideal brightness.

It should be understood that, to achieve an effect of alleviating or even eliminating the brightness jump, it is very critical to adjust screen brightness obtained when the first electronic device displays a picture frame. If a reduction amount is too small or too large, alleviation cannot be achieved, or even a more severe brightness jump may occur. To better eliminate a brightness jump phenomenon, a difference between the first screen ideal brightness and the screen brightness obtained when the first electronic device displays the picture frame (namely, the screen brightness indicated by the control information) preferably approaches first screen jump brightness. That is, an adjustment amount is exactly the screen jump brightness of the first electronic device. In this case, the screen actual brightness obtained when the first electronic device displays the picture frame can approach the screen ideal brightness.

To make the difference between the first screen ideal brightness and the screen brightness indicated by the control information preferably approach the first screen jump brightness, in this embodiment, the second screen jump brightness of the second electronic device obtained when the dimming mode switching occurs is obtained based on the second screen ideal brightness and the second screen actual brightness of the second electronic device obtained when the dimming mode switching occurs, where the second electronic device uses a same specification and type of original screen brightness parameter. In addition, the control information is obtained based on the difference between the second screen ideal brightness and the second screen jump brightness that are of the second electronic device. Therefore, a difference between the second screen ideal brightness and the screen brightness indicated by the obtained control information approaches the second screen jump brightness.

The second electronic device is an electronic device of a same specification and type as the first electronic device. Therefore, when being used to control screen brightness of the first electronic device, the control information obtained based on the second electronic device can also enable a screen brightness adjustment amount of the first electronic device to be exactly the screen jump brightness of the first electronic device. In this case, the screen actual brightness obtained when the first electronic device displays the picture frame can approach the screen ideal brightness.

In addition, in this embodiment, the screen brightness indicated by the control information in each screen brightness parameter is obtained based on the difference between the second screen ideal brightness and the second screen jump brightness. In this way, it is equivalent to that the control information corresponding to the first M picture frames obtained after the second electronic device detects that the dimming mode switching occurs is obtained based on an actual measured difference between the second screen ideal brightness and the second screen jump brightness. In this way, when being used for adjusting the first M picture frames obtained after the first electronic device detects that the dimming mode switching occurs, the control information corresponding to each picture frame is obtained based on actual measurement. Therefore, an effect of alleviating a jump is better.

In some other design manners of this application, the M screen brightness parameters include a plurality of first screen brightness parameters and at least one second screen brightness parameter; each first screen brightness parameter includes first control information corresponding to a first picture frame; and each second screen brightness parameter includes second control information corresponding to a second picture frame; the first control information is obtained by calculating second screen ideal brightness and second screen actual brightness of the second electronic device when the dimming mode switching occurs; the second screen ideal brightness is a preset brightness threshold that triggers the second electronic device to perform the dimming mode switching; and the second screen actual brightness is an actual brightness value obtained when the second electronic device displays the first picture frame; screen brightness indicated by the first control information in each first screen brightness parameter is obtained based on a difference between the second screen ideal brightness and second screen jump brightness; and the second screen jump brightness is a difference between the second screen actual brightness and the second screen ideal brightness; and screen brightness indicated by the second control information in each second screen brightness parameter is obtained by performing interpolation calculation based on two pieces of adjacent adjustment brightness of the second picture frame; and the adjacent adjustment brightness is screen brightness indicated by first control information corresponding to a first picture frame that is adjacent to the second picture frame and that is in the plurality of first screen brightness parameters.

In this embodiment, some control information is obtained based on actual measured data, and remaining control information is obtained based on an interpolation operation. This can avoid obtaining too much data and increasing a calculation amount. In addition, obtaining time of the M screen brightness parameters can be reduced, and obtaining difficulty is reduced.

In some embodiments, the difference between the first screen ideal brightness and the screen brightness indicated by the control information corresponding to the to-be-displayed picture frame is related to the first screen jump brightness. The first screen jump brightness refers to a jump amount that occurs in the screen brightness of the first electronic device when the first electronic device displays the picture frame.

In this embodiment, the screen brightness indicated by the control information corresponding to the to-be-displayed picture frame is lower than the first screen ideal brightness. In addition, the difference between the first screen ideal brightness and the screen brightness indicated by the control information corresponding to the to-be-displayed picture frame, namely, a degree to which the screen brightness indicated by the control information corresponding to the to-be-displayed picture frame is lower than the first screen ideal brightness, is related to the first screen jump brightness. It should be understood that the first screen jump brightness is a brightness jump caused by the TFT device. In this way, when the first electronic device displays the to-be-displayed picture frame based on the screen brightness indicated by the control information corresponding to the to-be-displayed picture frame, the brightness jump caused by the TFT device is superposed, so that displayed first screen actual brightness basically approaches the first screen ideal brightness, which basically completely eliminates a brightness jump phenomenon.

For example, the first screen jump brightness is a difference between the first screen actual brightness and the screen brightness indicated by the control information. The first screen actual brightness is the screen actual brightness of the first electronic device obtained when the first electronic device displays the picture frame.

It should be understood that, because the hysteresis effect of the TFT device always exists, a brightness jump (namely, the first screen jump brightness) still occurs after the first electronic device performs adjustment based on the control information corresponding to the to-be-displayed picture frame. It is just that brightness at this time jumps from the screen brightness indicated by the control information corresponding to the to-be-displayed picture frame to the first screen actual brightness. Therefore, the first screen jump brightness can be obtained by measuring the first screen actual brightness and calculating the difference between the first screen actual brightness and the screen brightness indicated by the control information corresponding to the to-be-displayed picture frame.

In some design manners of this application, the screen brightness parameter includes a frame sequence number and control information; the frame sequence number is used to indicate a sequence number of the picture frame output after the first electronic device detects the dimming mode switching; the control information is used to indicate screen brightness of the first electronic device when the first electronic device displays a picture frame corresponding to the frame sequence number; a frame sequence number of the to-be-displayed picture frame is k; and the control information corresponding to the to-be-displayed picture frame is control information corresponding to the frame sequence number k; and the adjusting screen brightness of the first electronic device to the screen brightness indicated by the control information corresponding to the to-be-displayed picture frame includes: adjusting the screen brightness of the first electronic device to screen brightness indicated by the control information corresponding to the frame sequence number k.

Data is output on a screen of the first electronic device based on a frame form. Therefore, in this embodiment, a frame is used as a unit, and for each of the first M picture frames obtained after the first electronic device detects that the dimming mode switching occurs, one piece of control information corresponding to a frame sequence number of the picture frame is stored. In this way, when the first electronic device performs control in a unit of frame, brightness jump alleviation can be implemented on each of the first M picture frames obtained after the first electronic device detects that the dimming mode switching occurs.

In some other design manners of this application, the screen brightness parameter includes a time node and control information. The time node is used to indicate a moment obtained after the first electronic device detects the dimming mode switching. The first electronic device displays a picture frame at the time node. The control information is used to indicate screen brightness of the first electronic device at the time node. The first electronic device displays the to-be-displayed picture frame at a third time node in the M screen brightness parameters, and the control information corresponding to the to-be-displayed picture frame is control information corresponding to the third time point. The adjusting screen brightness of the first electronic device to the screen brightness indicated by the control information corresponding to the to-be-displayed picture frame includes: adjusting the screen brightness of the first electronic device to screen brightness indicated by the control information corresponding to the third time node.

In this embodiment, the following is stored: a time node in a brightness jump time period obtained after the first electronic device detects that the dimming mode switching occurs and control information corresponding to the time node. It should be understood that a corresponding picture frame is inevitably output at the time node in the brightness jump time period obtained after the first electronic device detects that the dimming mode switching occurs. Data is output on a screen of the first electronic device based on a frame form. Therefore, when control information corresponding to each time node is used for control, a picture frame correspondingly displayed at the time node needs to be first determined. For this embodiment, a time point corresponding to the to-be-displayed picture frame needs to be confirmed first, and then invoking is performed.

For example, before the obtaining control information corresponding to a to-be-displayed picture frame, the method further includes: determining frame display duration of one picture frame of the first electronic device based on a current screen refresh rate of the first electronic device. A display time period of the to-be-displayed picture frame is determined based on a moment at which the first electronic device detects that the dimming mode switching occurs, the frame sequence number of the to-be-displayed picture frame, and the frame display duration. A time node that is in the M screen brightness parameters and that is in the display time period of the to-be-displayed picture frame is the time node corresponding to the to-be-displayed picture frame.

Specifically, the display time period of the to-be-displayed picture frame may be $t1+(k-1)*T \sim t1+k*T$, or may be $t1+k*T \sim t1+(k+1)*T$, where t1 is a moment at which the first electronic device detects that the dimming mode switching occurs, namely, the foregoing first time point; T is frame display duration of the to-be-displayed picture frame, and is a reciprocal of the current screen refresh rate of the first electronic device; and k is the frame sequence number of the to-be-displayed picture frame.

Optionally, the M screen brightness parameters are one of a plurality of groups of screen brightness parameters; and one group of the screen brightness parameters corresponds to one screen refresh rate. The M screen brightness parameters are a group of screen brightness parameters corresponding to the current screen refresh rate of the first electronic device.

In this embodiment, it should be understood that, when the current screen refresh rate of the first electronic device is different, the frame quantity M of the picture frames in which the brightness jump occurs after the first electronic device detects that the dimming mode switching occurs is not consistent, and screen jump brightness corresponding to each frame is also different. Considering that the first electronic device may switch between a plurality of screen refresh rates, screen brightness parameters corresponding to each screen refresh rate are provided.

In some embodiments of this application, when detecting that the dimming mode switching occurs, the first electronic device obtains the control information corresponding to the to-be-displayed picture frame, where k is sequentially 1, 2, . . . , and M.

In this embodiment, in response to detecting that the dimming mode switching occurs, the first electronic device starts to perform the screen brightness adjustment method on each of the first M picture frames obtained after it is detected that the dimming mode switching occurs, so that brightness jump alleviation can be implemented on all the first M picture frames obtained after it is detected that the dimming mode switching occurs. In addition, the screen brightness adjustment method starts to be performed only when it is detected that the dimming mode switching occurs. This can avoid a problem of a large data processing amount caused by always monitoring whether the to-be-displayed picture frame is one of the first M picture frames obtained after it is detected that the dimming mode switching occurs.

According to a second aspect, an electronic device is provided, and includes a display module, a memory, and a processor. The display module and the memory are coupled to the processor. The memory stores computer program code, the computer program code includes computer instructions, and when the computer instructions are executed by the processor, the electronic device is enabled to perform the screen brightness adjustment method according to any one of the design manners in the first aspect.

According to a third aspect, a computer-readable storage medium is provided, and includes computer instructions. When the computer instructions are run on an electronic device, the electronic device is enabled to perform the screen brightness adjustment method according to any one of the design manners in the first aspect.

For technical effects brought by any one of design manners in the second aspect and the third aspect, refer to the technical effects brought by different design manners in the first aspect. Details are not described herein again.

DESCRIPTION OF EMBODIMENTS

Figure 1:
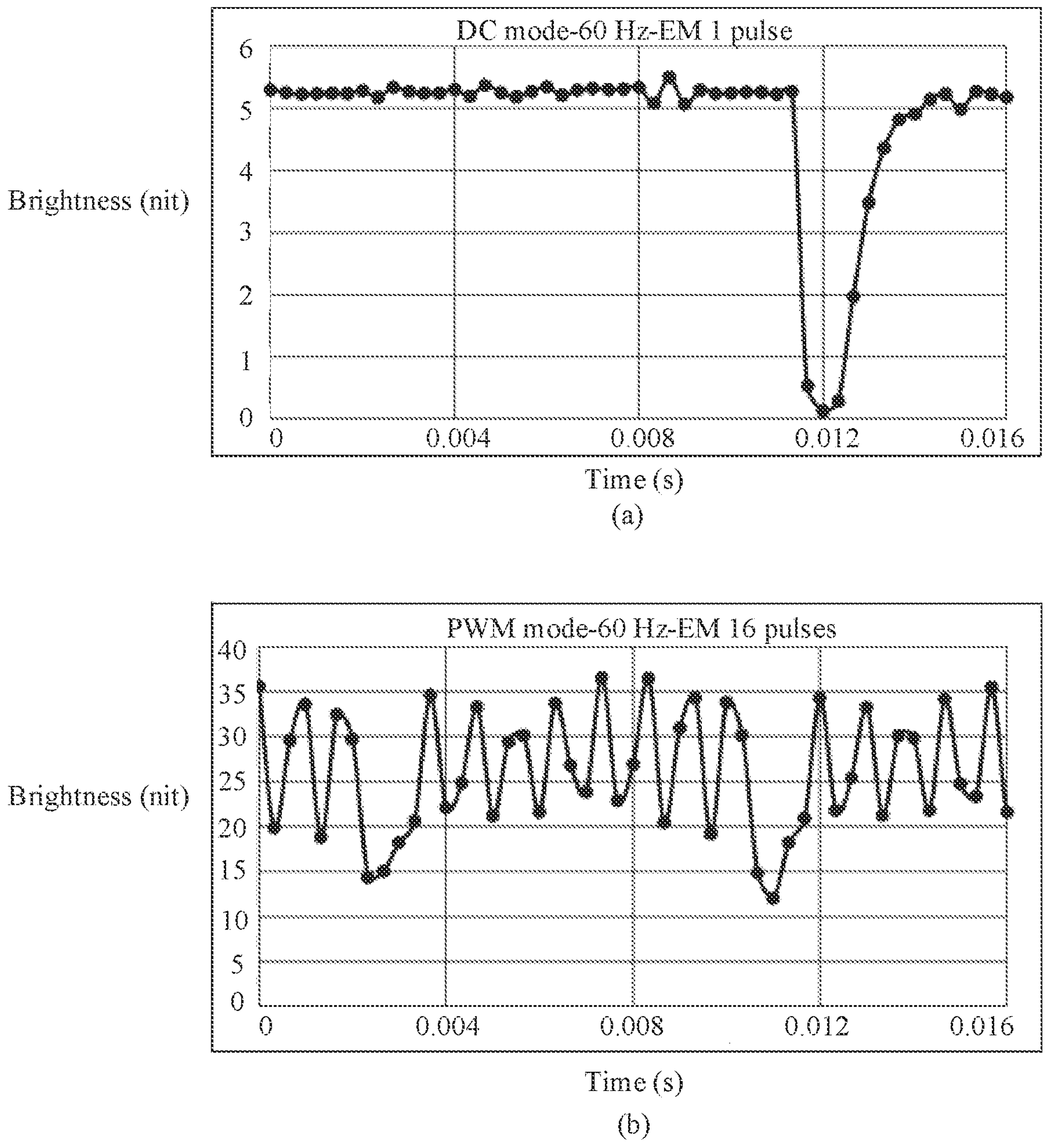
FIG. 1 is a diagram of comparison between brightness change curves in time of a next frame in a DC mode and a PWM mode according to an embodiment of this application.

In the embodiments of this application, words such as "example" or "for example" are used to represent giving an example, an illustration, or a description. Any embodiment or design solution described as "example" or "for example" in the embodiments of this application should not be construed as being more preferred or advantageous than other embodiments or design solutions. Exactly, use of the words such as "example" or "for example" is intended to present a related concept in a specific manner.

In the embodiments of this application, the terms "first" and "second" are merely used for the purpose of description, and should not be understood as an indication or implication of relative importance or an implicit indication of a quantity of indicated technical features. Therefore, features defined with "first" and "second" may explicitly or implicitly include one or more of the features.

It should be understood that the terms used in description of the various examples in this specification are intended for describing specific examples only rather than limiting them. As used in the descriptions of the various examples, singular forms "one" ("a" or "an") and "the" are intended to include plural forms as well, unless otherwise explicitly indicated in the context.

In this application, "at least one" means one or more, and "a plurality of" means two or more. "At least one of the following items" or a similar expression thereof means any combination of these items, including a single item or any combination of a plurality of items. For example, at least one of a, b, or c may represent a, b, c, a-b, a-c, b-c, or a-b-c, where a, b, and c may be singular or plural.

It should be further understood that the term "and/or" used in this specification refers to and covers any of and all possible combinations of one or more associated listed items. The term "and/or" is an association relationship that describes associated objects, and indicates that three relationships may exist. For example, "A and/or B" may indicate the following three cases: Only A exists, both A and B exist, and only B exists. In addition, the character "/" in this application usually indicates an "or" relationship between associated objects.

It should be further understood that in this application, the term "connection" refers to an electrical connection manner in which an electrical signal can be transmitted. The term "connection" should be understood in a broad sense, for example, "connection" may be a direct connection, or an indirect connection by using an intermediate medium.

It should be further understood that, the terms "include" (also referred to as "includes", "including", "comprises" and/or "comprising"), when used in the specification, specify the presence of stated features, integers, steps, operations, elements, and/or components, but do not preclude the presence or addition of one or more other features, integers, steps, operations, elements, components, and/or groups thereof.

It should be understood that "an embodiment", "another embodiment", or "in a possible design manner" mentioned throughout the specification means that particular features, structures, or characteristics related to the embodiments or the implementations are included in at least one embodiment of this application. Therefore, "in an embodiment of this application", "in another embodiment of this application", or "in a possible design manner" that occurs in everywhere throughout the specification may not necessarily refer to the same embodiment. In addition, these specific features, structures, or characteristics may be combined in one or more embodiments in any appropriate manner.

To better understand the solutions of this application, technical terms in the embodiments of this application are first explained.

(1) A screen refresh rate refers to a quantity of times a screen picture is refreshed per second.

For example, if the screen refresh rate is 120 Hz, it indicates that the screen image is refreshed 120 times per second, that is, 120 picture frames are output per second.

(2) A duty cycle refers to a ratio of time occupied by a pulse to total time during continuous working time.

(3) A direct current (DC) mode refers to a manner in which screen power is changed by changing a current or a voltage of a screen to adjust screen brightness.

(4) A pulse width modulation (PWM) mode refers to a manner of adjusting screen brightness by changing a duty cycle of a PWM signal that drives a screen.

It should be noted that, in the PWM mode, an emission (EM) signal in a PWM form is used to control the screen, and brightness can be adjusted by adjusting a duty cycle of the EM signal, namely, duration of a high level. It should be noted that, in the PWM mode, the screen is turned on at a high level of the EM signal, and is turned off at a low level of the EM signal. Therefore, the screen flashes under driving of the EM signal. By controlling a frequency of the EM signal, an alternating speed of turning on and off can be changed. As long as the alternating speed of turning on and off is high enough, it is difficult for human eyes to perceive this process due to persistence of vision, and it is considered that the screen is always turned on.

An electronic device such as a mobile phone has two dimming modes: a DC mode and a PWM mode. Because the DC mode has problems of changing of parameters such as a screen color, high power consumption, and the like, the PWM mode is introduced. Referring to FIG. 1, FIG. 1 is a schematic diagram of comparison between brightness change curves in time of a next frame in a DC mode and a PWM mode by using an example in which a screen refresh rate is 60 Hz (time of one frame is 0.016 s). It should be understood that a brightness change within time of one frame may be considered as a change of an EM signal. It may be learned from comparison between (a) in FIG. 1 and (b) in FIG. 1 that the EM signal in the two dimming modes is completely different in terms of a quantity of pulses or periods and a duty cycle in one frame. Specifically, the EM signal in the PWM mode has 16 pulses (and also has 16 periods) in one frame, the EM signal in the DC mode has one pulse (and also has one period), and a frequency of the EM signal in the PWM mode is higher. In addition, a duty cycle of the EM signal in the DC mode is much higher than a duty cycle of the EM signal in the PWM mode.

The following describes a difference between dimming principles of the DC mode and the PWM mode with reference to FIG. 1.

As shown in (a) in FIG. 1, because the DC mode does not change the duty cycle of the EM signal to adjust screen brightness, the quantity of pulses and the duty cycle of the EM signal in the DC mode do not change regardless of a screen brightness requirement.

As shown in (b) in FIG. 1, the PWM mode adjusts screen brightness by changing the duty cycle of the EM signal, and different screen brightness requirements affect the duty cycle of the EM signal. When a screen brightness requirement is relatively high, the screen brightness requirement is met by increasing the duty cycle of the EM signal. It should be understood that a higher duty cycle of the EM signal indicates that a pulse of the EM signal takes most of the time, which approaches pulse time of the EM signal in the DC mode. However, because the EM signal is still in the PWM mode, the quantity of pulses of the EM signal in one frame does not change. However, a quantity of switching times of a screen drive circuit is determined based on the quantity of pulses of the EM signal in one frame. A larger quantity of switching times of the screen drive circuit leads to higher power consumption. Therefore, in consideration of power consumption, the electronic device switches to the DC mode when a screen brightness requirement is relatively high, and switches back to the PWM mode when there is another screen brightness requirement.

The following describes scenarios including dimming mode switching of the electronic device with reference to some common examples.

Figure 2A:
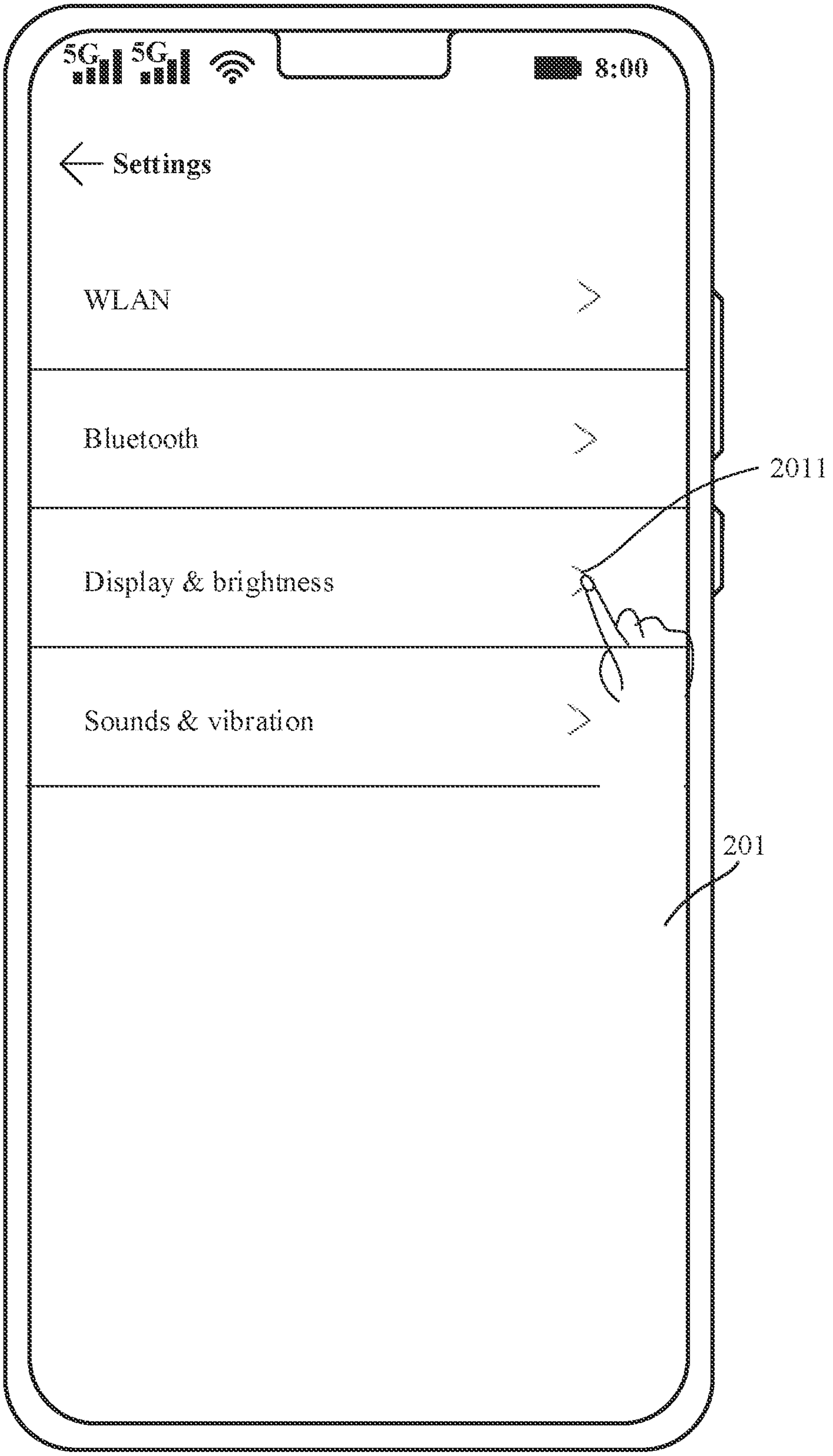
FIG. 2A and FIG. 2B are a diagram of a scenario of dimming mode switching according to an embodiment of this application.

Scenario 1: For example, a mobile phone is used as an example. Referring to FIG. 2A, the electronic device has a setting interface 201, and the setting interface 201 has a display and brightness function option 2011. In response to a tap operation performed by a user on the display and brightness function option 2011, the electronic device displays a display and brightness interface 202 shown in FIG. 2B. The display and brightness interface 202 includes a brightness bar 2021 and a brightness block 2022 that are used to adjust screen brightness. In response to a drag operation performed by the user on the brightness block 2022, the brightness block 2022 slides on the brightness bar 2021, and the screen brightness is adjusted. Specifically, when the brightness block 2022 slides rightward along the brightness bar 2021, the screen brightness increases. When the brightness block 2022 slides leftward along the brightness bar 2021, the screen brightness decreases. It should be noted that, in another scenario, brightness adjustment may alternatively be performed based on another interface. This is not specifically limited in this embodiment of this application.

In consideration of power consumption, when the screen brightness of the electronic device exceeds a preset brightness threshold (for example, 90 nit), the electronic device switches to the DC mode. In addition, when the screen brightness is lower than a preset brightness threshold (for example, 90 nit), the electronic device switches to the PWM mode.

Figure 3A:
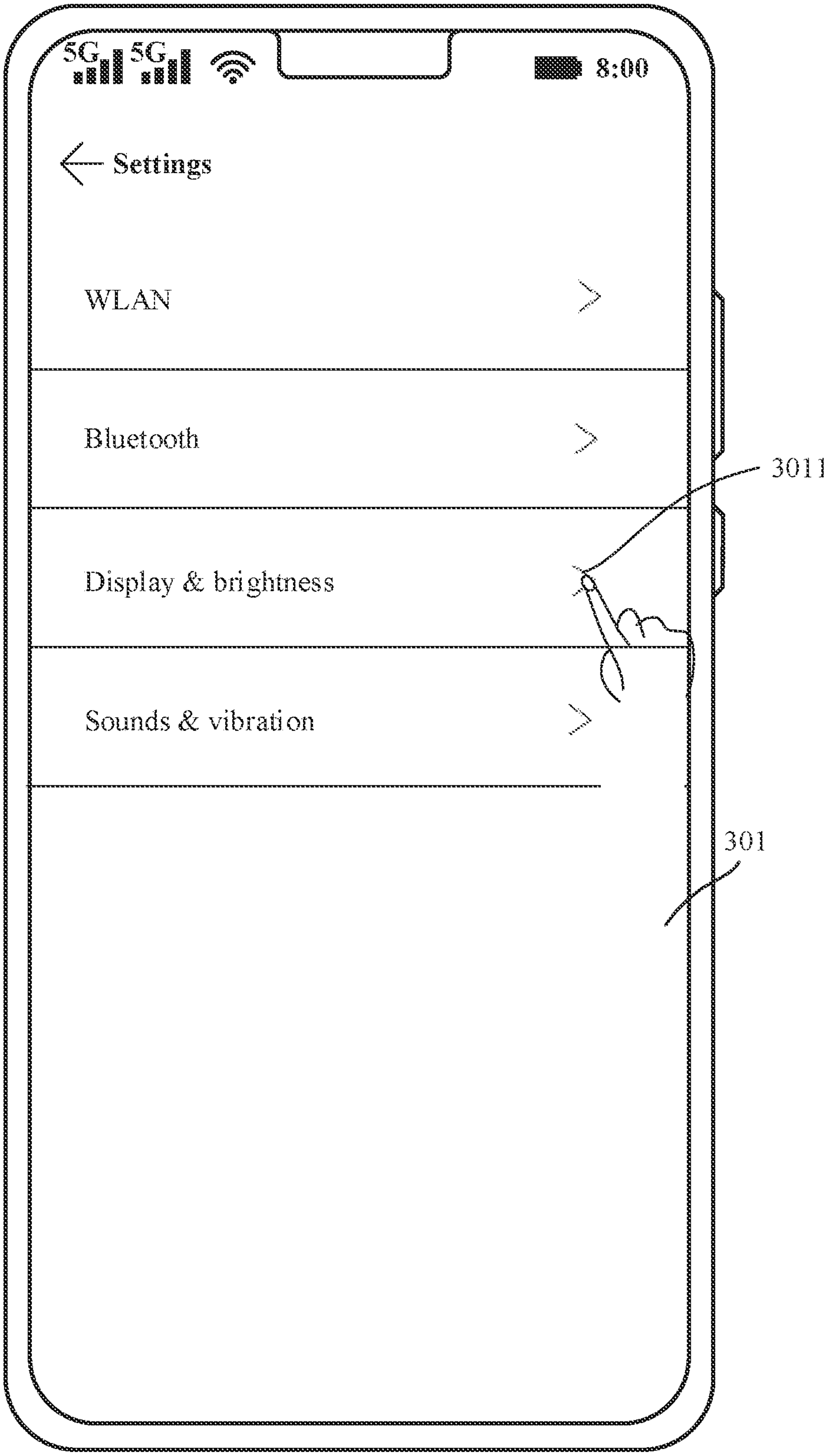
FIG. 3A to FIG. 3C are a diagram of another scenario of dimming mode switching according to an embodiment of this application.
Figure 3B:
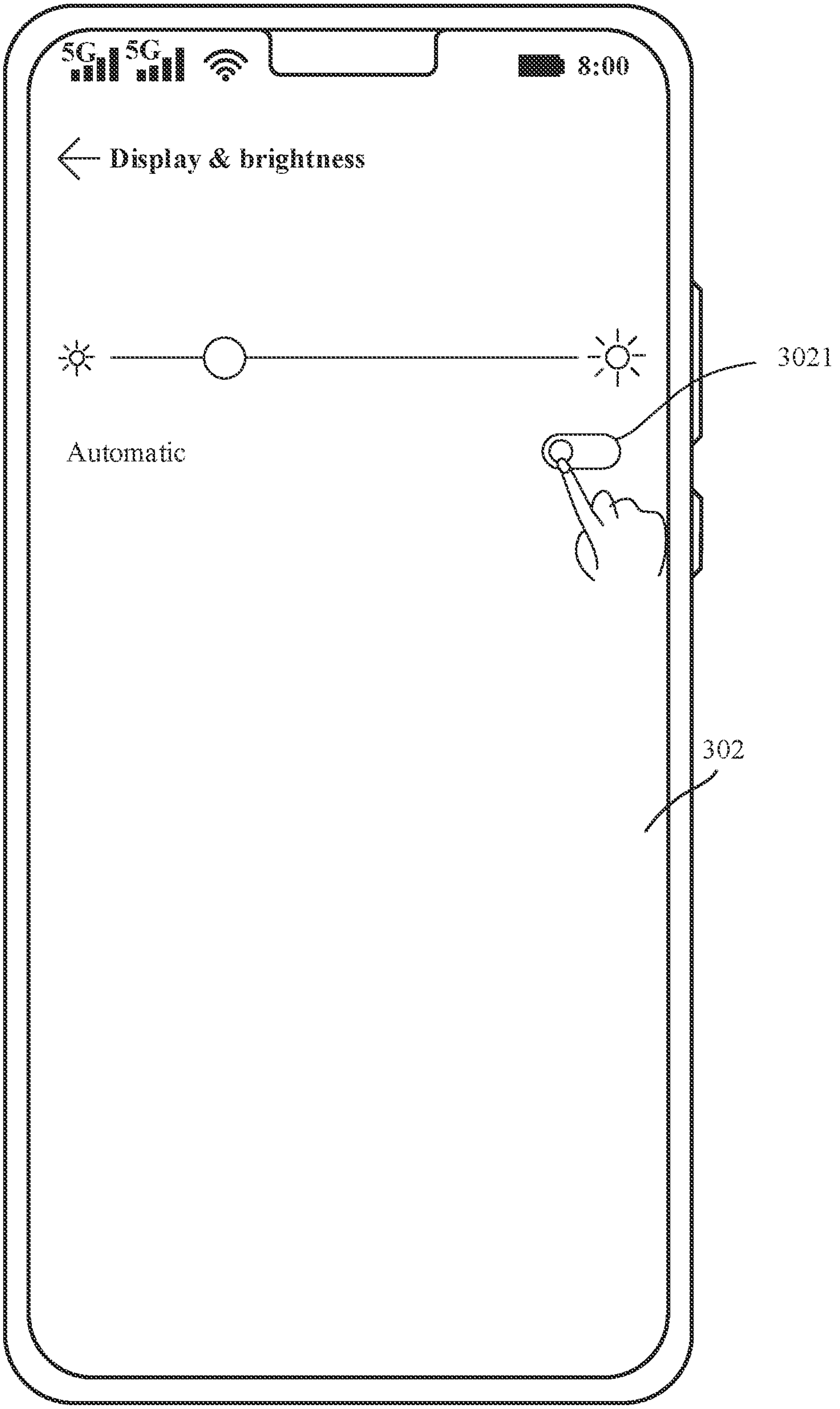

Scenario 2: For example, a mobile phone is used as an example. Referring to FIG. 3A, the electronic device has a setting interface 301. The setting interface 301 has a display and brightness function option 3011. In response to a tap operation performed by the user on the display and brightness function option 3011, the electronic device displays a display and brightness interface 302 shown in FIG. 3B. As shown in FIG. 3B, the display and brightness interface 302 includes a switch control 3021 used to enable an automatic adjustment function of screen brightness. In response to an enabling operation performed by the user on the switch control 3021, the electronic device displays a display and brightness interface 303 shown in FIG. 3C. It should be noted that after the automatic adjustment function is enabled, the electronic device automatically adjusts screen brightness based on ambient light brightness detected by an ambient light sensor in real time.

Figure 3C:
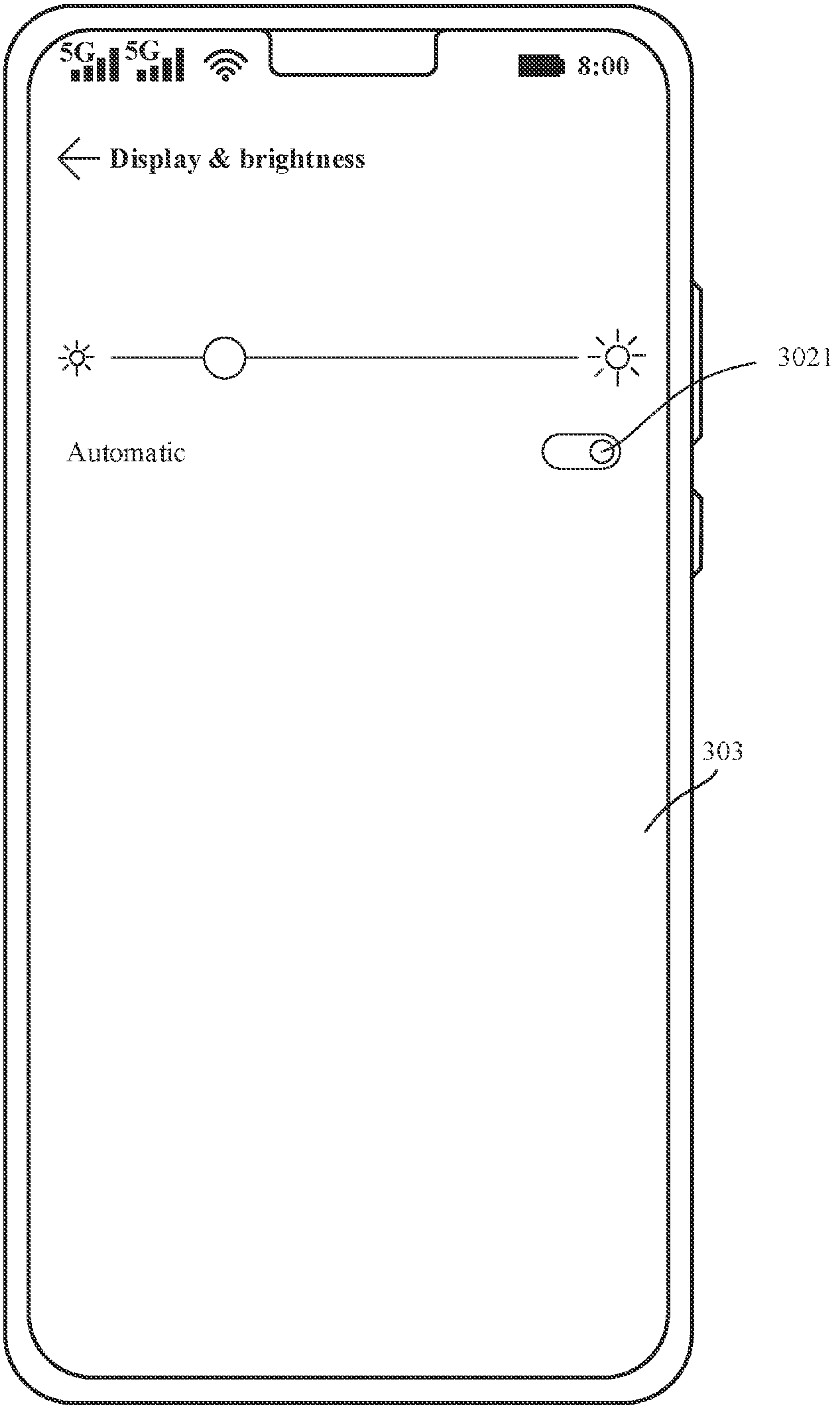

It may be learned that the scenario shown in FIG. 3A to FIG. 3C also relates to screen brightness adjustment. For a same reason, the scenario shown in FIG. 3A to FIG. 3C may also relate to a case in which the DC mode is switched to the PWM mode or a case in which the PWM mode is switched to the DC mode.

Scenario 1 and Scenario 2 are merely examples. A process of dimming mode switching may also be involved in another brightness adjustment scenario, for example, a scenario in which a high-dynamic range (HDR) picture is switched to a software defined radio (SDR) picture or a gallery interface is switched to a user interface (UI) interface (for example, a home screen of a mobile phone). These scenarios related to dimming mode switching are all applicable to a screen brightness adjustment method mentioned in the following embodiments. Details are not enumerated exhaustively herein.

Figure 2B:
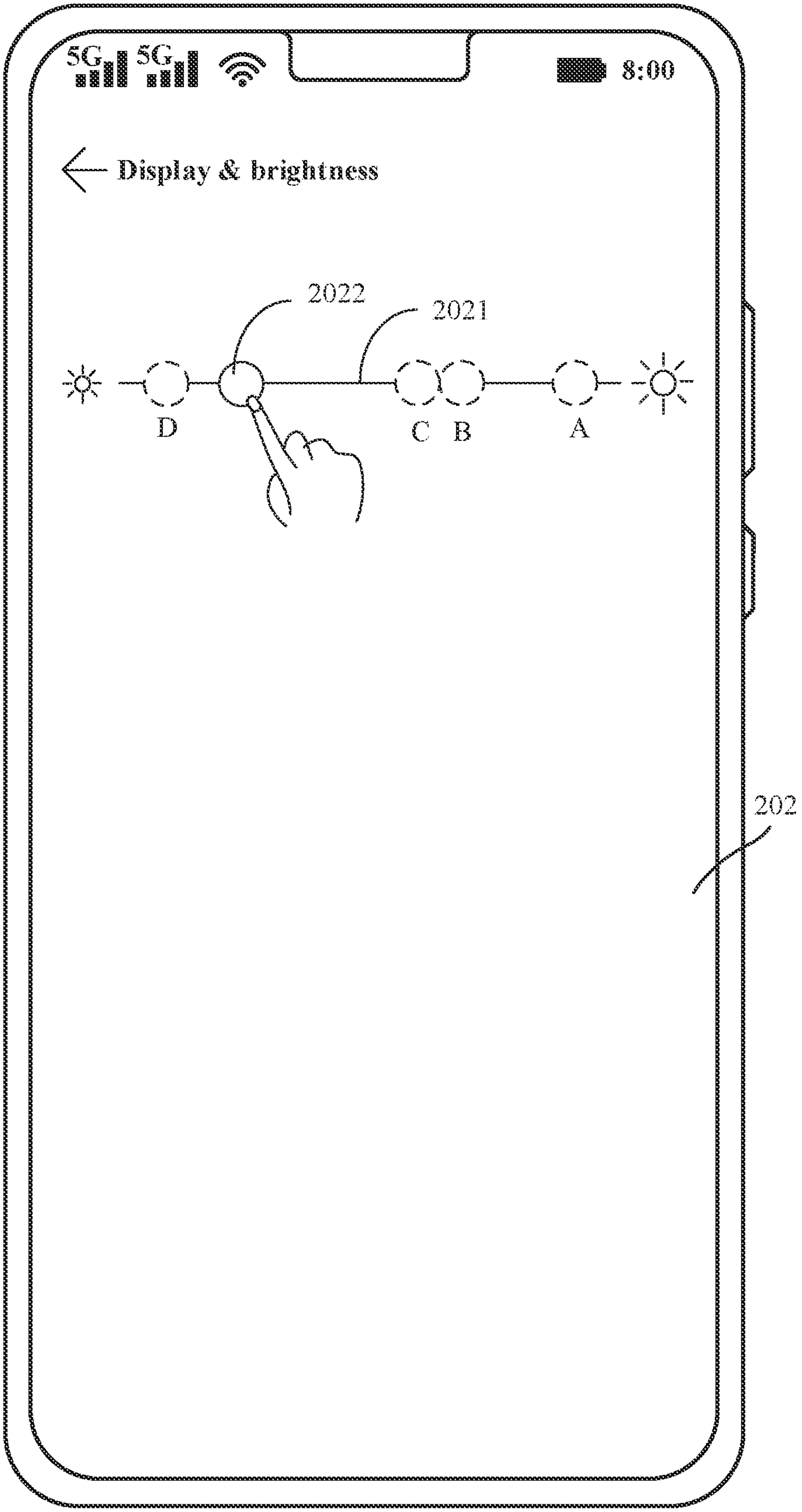

The following uses Scenario 1 shown in FIG. 2A and FIG. 2B as an example to describe in detail a process in which the electronic device switches from the PWM mode to the DC mode.

TABLE 1

Screen brightness parameter table of an electronic device

| 60 Hz | Brightness | DBV node/decimal | Dimming mode | Duty | Vref | ELVSS | VGMP | Gamma index level |
|---|---|---|---|---|---|---|---|---|
| BAND0-DC | 1000 | 4000 | DC/1 Pulse | 97.68% | −5 | −4.3 | 6.7 V | 2.2 |
| BAND1-DC | 600 | 3515 | DC/1 Pulse | 97.68% | −5 | −3 | 6.7 V | 2.2 |
| BAND2-DC | 340 | 2670 | DC/1 Pulse | 97.68% | −5 | −2.7 | 6.7 V | 2.2 |
| BAND3-DC | 160 | 1785 | DC/1 Pulse | 97.68% | −5 | −2.7 | 6.7 V | 2.2 |
| BAND4-DC | 90 | 1290 | DC/1 Pulse | 97.68% | −5 | −2.7 | 6.7 V | 2.2 |
| BAND5-PWM | 90 | 1289 | PWM/16 Pulses | 76.99% | −5 | −2.7 | 6.7 V | 2.2 |
| BAND6-PWM | 42 | 890 | PWM/16 Pulses | 39.89% | −5 | −2.7 | 6.7 V | 2.2 |
| BAND7-PWM | 10 | 363 | PWM/16 Pulses | 19.93% | −5 | −2.7 | 6.7 V | 2.2 |
| BAND8-PWM | 2 | 1 | PWM/16 Pulses | 10.29% | −5 | −2.7 | 6.7 V | 2 |

Referring to Table 1, Table 1 is a table of some screen brightness parameters of the electronic device in FIG. 2A and FIG. 2B. In FIG. 2A and FIG. 2B, when sliding from left to right along the brightness bar 2021 to different locations, the brightness block 2022 sequentially corresponds to screen brightness parameters in different rows from bottom to top in Table 1. It should be noted that different locations on the brightness bar 2021 correspond to different display brightness values (DBV). Table 1 shows only screen brightness parameters corresponding to some locations. When the brightness block 2022 in FIG. 2B slides along the brightness bar 2021 to a location, the electronic device is triggered to identify a DBV value corresponding to the location, and obtains a corresponding screen brightness parameter based on the DBV value to drive a screen.

For example, it is assumed that a DBV value of a location in which a dashed circle A in FIG. 2B is located is DBV2670, that is, corresponds to a third row in Table 1. When the brightness block 2022 slides to the dashed circle A on the brightness bar 2021, the electronic device identifies that a current DBV value is DBV2670, so that screen brightness is adjusted to 340 based on screen brightness parameters corresponding to Table 1, including screen brightness: 340 nit; dimming mode: DC mode; dimming signal: one pulse; duty cycle: 97.68%; Vref: −5; ELVSS: −2.7; VGMP: 6.7 V; and Gamma index level: 2.2. It should be understood that the dashed circle A in FIG. 2B is displayed for ease of understanding. In a specific implementation process, there is no dashed circle on the brightness bar 2021 of the setting interface 201. Similarly, the foregoing description is also applicable to a dashed circle B, a dashed circle C, and a dashed circle D.

By observing data in Table 1, it may be learned that the PWM mode is used when the screen brightness of the electronic device is less than 90 nit; and the DC mode is used when the screen brightness is more than 90 nit. That is, the electronic device performs dimming mode switching when the screen brightness is 90 nit. It may be learned from a fourth row and a fifth row of data from bottom to top of Table 1 that 90 nit corresponds to two DBV values of DBV1290 and DBV1289, and therefore corresponds to two locations of the brightness bar 2021. Assuming that DBV values of locations circled by the dashed circle B and the dashed circle C in FIG. 2B are respectively DBV1290 and DBV1289, this means that the screen brightness is adjusted to 90 nit when the brightness block 2022 slides to the dashed circle B and the dashed circle C on the brightness bar 2021. A difference is that the DC mode is used for dimming when the brightness block 2022 slides to the dashed circle B, and the PWM mode is used for dimming when the brightness block 2022 slides to the dashed circle C.

The foregoing process of the dimming mode switching is specifically as follows: When sliding from the dashed circle D (whose corresponding DBV value is DBV890) to the dashed circle A along the brightness bar 2021, the brightness block 2022 sequentially passes through the dashed circle C and the dashed circle B. The electronic device detects that a DBV value is switched from DBV1289 to DBV1290, and triggers an action of switching from the PWM mode to the DC mode. On the contrary, when sliding from the dashed circle A to the dashed circle D along the brightness bar 2021, the brightness block 2022 sequentially passes through the dashed circle B and the dashed circle C. The electronic device detects that a DBV value is switched from DBV1290 to DBV1289, and triggers an action of switching from the DC mode to the PWM mode.

Figure 4:
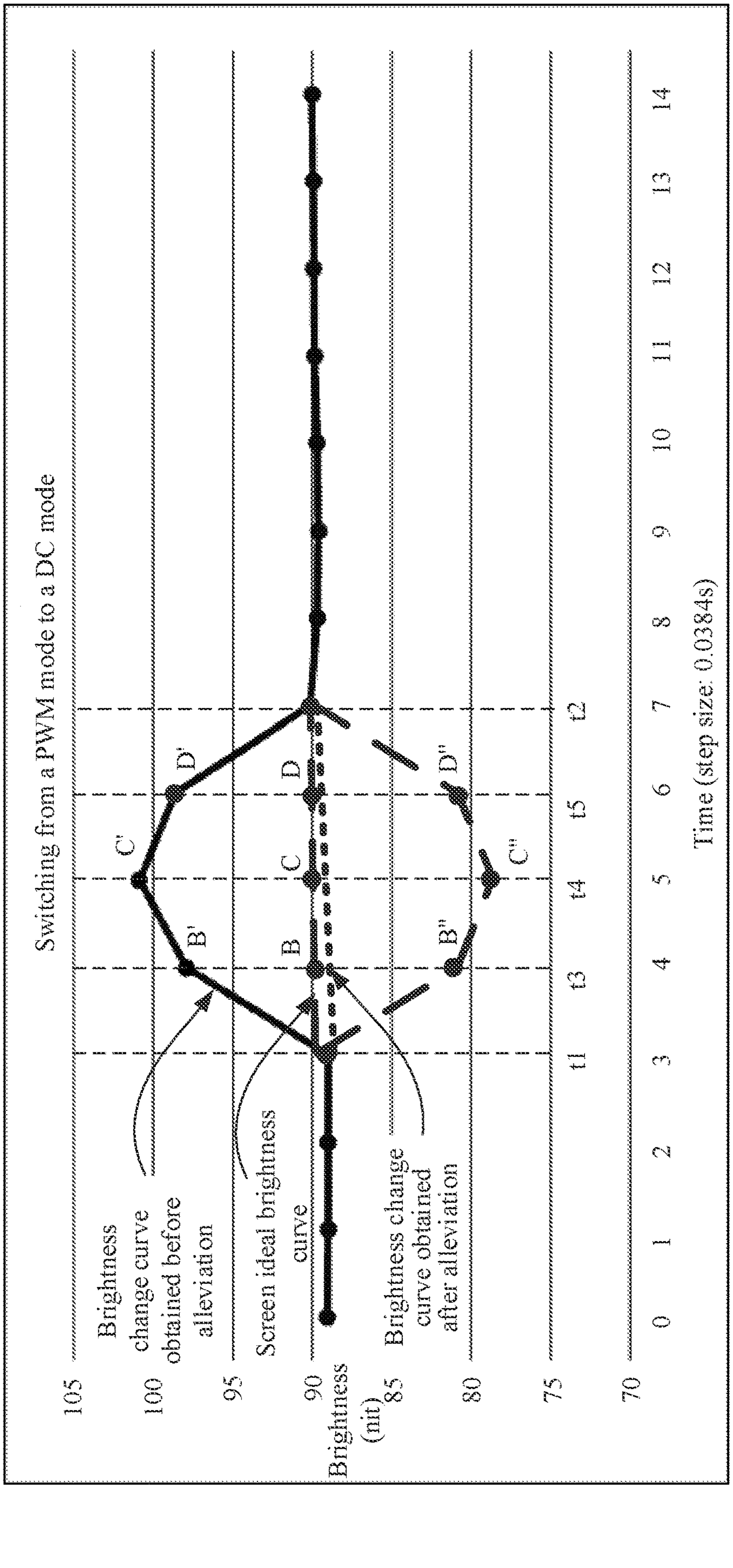
FIG. 4 is a diagram of brightness change curves of an electronic device when switching from a PWM mode to a DC mode according to an embodiment of this application.

It may be learned from the foregoing analysis on FIG. 1 that an EM signal in two dimming modes of the PWM mode and the DC mode is completely different in terms of a quantity of pulses or periods and a duty cycle in one frame. Therefore, due to this difference, the electronic device needs to perform time sequence switching and pulse switching for the EM signal when performing the dimming mode switching. It should be noted that a coupling capacitance inside the screen of the electronic device undergoes a transient change when a time sequence and the pulse of the EM signal are transiently switched. However, because a TFT device in a screen drive circuit that performs switching cannot respond instantaneously due to a hysteresis effect, the electronic device has a visual brightness jump problem when the dimming mode switching occurs. FIG. 4 illustrates a brightness jump problem.

Referring to FIG. 4, FIG. 4 is a diagram of brightness change curves of an electronic device when switching from a PWM mode to a DC mode according to an embodiment of this application. FIG. 4 continues to use the foregoing examples in Table 1 and FIG. 2A and FIG. 2B, and illustrates only brightness change curves of a part in which the brightness block 2022 in FIG. 2B slides from the dashed circle C to the dashed circle B during sliding from the dashed circle D to the dashed circle A. It should be noted that, that the brightness block 2022 slides from the dashed circle D to the dashed circle A represents that screen brightness of the electronic device is switched from 42 nit to 340 nit. A screen brightness adjustment process of the electronic device is as follows: The electronic device gradually rises from 42 nit to 340 nit, instead of directly rising from 42 nit to 340 nit. Therefore, in this adjustment process, a node of 90 nit is inevitably passed through, and a switching process illustrated by the brightness change curves in FIG. 4 is experienced.

As shown in FIG. 4, when a time node t1 is a moment at which the brightness block 2022 slides to the dashed circle B, the electronic device detects, at the time node t1, that a DBV value is switched from DBV1289 to DBV1290, and then triggers to perform dimming mode switching (that is, switches to use a screen brightness parameter corresponding to DBV1290). Because the TFT device cannot respond instantaneously and cannot switch instantaneously, the screen brightness of the electronic device jumps in a period of time from the time node t1 (a moment at which brightness starts to jump) to a time node t2 (a moment at which brightness stops jumping) (subsequently, this time period from the time node t1 to the time node t2 is briefly referred to as a brightness jump time period), and becomes stable until the time node t2. This case represents that the TFT device completes the dimming mode switching, and the TFT device successfully switches to the screen brightness parameter corresponding to DBV1290.

It should be understood that, the electronic device adjusts the screen brightness to screen brightness (illustrated by a dashed line) 90 nit corresponding to DBV1290 in the brightness jump time period. Subsequently, this screen brightness is referred to as screen ideal brightness. However, for a device reason, final screen actual brightness (illustrated by a solid line) of the electronic device is higher than 90 nit, and maximum screen jump brightness (namely, a difference between the screen actual brightness and the screen ideal brightness) reaches 11 nit.

To resolve a brightness jump problem of the electronic device when the dimming mode switching occurs, an embodiment of this application provides a screen brightness adjustment method, applied to the electronic device. For example, the electronic device may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) \virtual reality (VR) device, or the like that includes a foldable screen. A specific form of the device is not specifically limited in this embodiment of this application.

Considering that transmission is performed on the screen of the electronic device by using a frame as a unit, this means that there is no brightness jump when the electronic device outputs no picture frame, and the brightness jump is accompanied by picture frame output. Therefore, in the screen brightness adjustment method, for picture frames output by the electronic device in the brightness jump time period (subsequently, the picture frame output by the electronic device in the brightness jump time period is briefly referred to as a jump picture frame), screen brightness obtained when the electronic device displays these jump picture frames is reduced. In this way, when the electronic device displays these jump picture frames, jump brightness of the TFT device is superposed, so that a brightness jump phenomenon can be alleviated, or the phenomenon can even be eliminated.

It should be understood that, to achieve an effect of alleviating or even eliminating the brightness jump, it is very critical to adjust screen brightness obtained when the electronic device displays the jump picture frame. If a reduction amount is too small or too large, alleviation cannot be achieved, or even a more severe brightness jump may occur.

FIG. 4 is used as an example. The electronic device displays a picture frame P1 at a time node t4, and screen ideal brightness corresponding to the time node t4 is 90 nit, screen jump brightness is 11 nit, and screen actual brightness is 101 nit. If screen brightness obtained when the electronic device displays the picture frame P1 is adjusted to 85 nit, when the electronic device actually displays the picture frame P1, the screen jump brightness 11 nit is superposed, and final screen actual brightness is 86 nit (which is less than 101 nit), which exceeds the screen ideal brightness 90 nit.

Although it is effective, this effect is not obvious. If screen brightness obtained when the electronic device displays the picture frame P1 is adjusted to 50 nit, when the electronic device actually displays the picture frame P1, the screen jump brightness 11 nit is superposed, and final screen actual brightness is 61 nit, which is far lower than the screen ideal brightness 90 nit, and a more obvious brightness jump appears. If screen brightness obtained when the electronic device displays the picture frame P1 is adjusted to 81 nit (which is exactly a difference between the screen ideal brightness and the screen jump brightness), when the electronic device actually displays the picture frame P1, the screen jump brightness 11 nit is superposed, and final screen actual brightness is exactly the screen ideal brightness 90 nit.

It may be learned that, to better eliminate the brightness jump phenomenon, the screen brightness obtained when the electronic device displays the jump picture frame is adjusted to the difference between the screen ideal brightness and the screen jump brightness, that is, an adjustment amount is exactly the screen jump brightness. In this case, the screen actual brightness obtained when the electronic device displays the jump picture frame can approach the screen ideal brightness. Therefore, to eliminate the brightness jump phenomenon as much as possible, in this embodiment of this application, based on the screen jump brightness obtained when the electronic device displays the jump picture frame, a set of new screen brightness parameters that are different from original screen brightness parameters are determined, and the set of screen brightness parameters are stored, so that the electronic device performs invoking when performing the screen brightness adjustment method, thereby eliminating the brightness jump phenomenon. Based on this, before the screen brightness adjustment method provided in this embodiment of this application is described in detail, the following first describes a method for obtaining the set of new screen brightness parameters.

It should be noted that, to obtain the screen jump brightness obtained when the electronic device displays the jump picture frame, the method for obtaining the screen brightness parameter may be obtained by measuring an electronic device that does not use the screen brightness adjustment method. For ease of distinction, in subsequent embodiments, an electronic device that uses the screen brightness adjustment method is referred to as a first electronic device, and the electronic device that does not use the screen brightness adjustment method is referred to as a second electronic device. It should be understood that a difference between the first electronic device and the second electronic device lies only in that: The second electronic device is an electronic device that performs screen adjustment by using the original screen brightness parameters in the foregoing brightness jump process, for example, the electronic device mentioned in FIG. 4, and the screen brightness parameters shown in Table 1 used by the second electronic device are the original screen brightness parameters. The first electronic device is an electronic device that performs screen adjustment by using the new screen brightness parameters in the foregoing brightness jump process. In addition, the two electronic devices are the same in another aspect.

Figure 5:
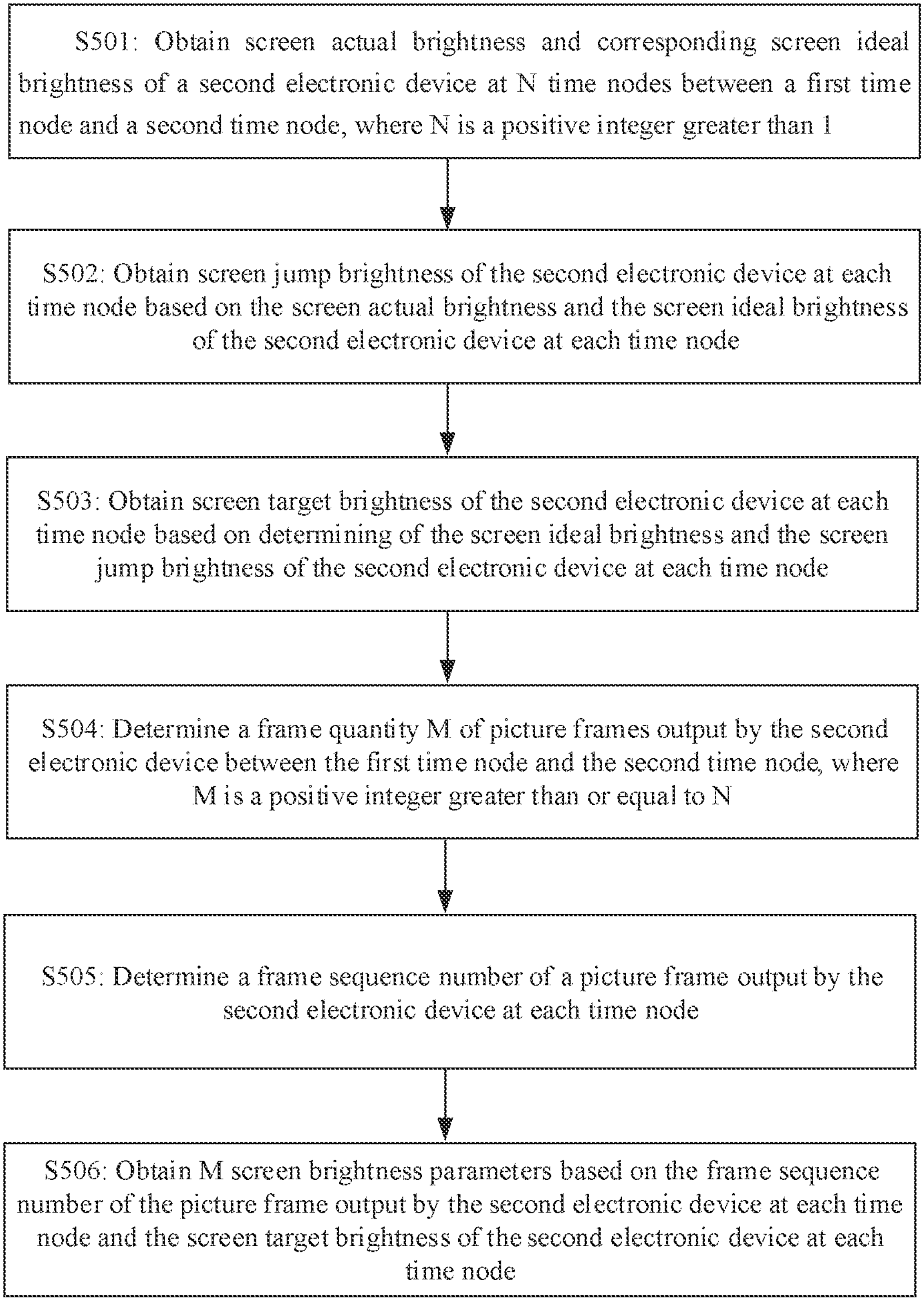
FIG. 5 is a flowchart of a method for obtaining a screen brightness parameter according to an embodiment of this application.

Referring to FIG. 5, FIG. 5 is a flowchart of a method for obtaining a screen brightness parameter according to an embodiment of this application. The second electronic device in this embodiment drives a screen by using original screen brightness information shown in Table 1, and the method includes:

S501: Obtain screen actual brightness and screen ideal brightness of the second electronic device at N time nodes between a first time node and a second time node, where N is a positive integer greater than 1.

The first time node is a moment at which screen brightness of the second electronic device starts to jump when the second electronic device detects that dimming mode switching occurs. The second time node is a moment at which the screen brightness of the second electronic device stops jumping when the second electronic device detects that the dimming mode switching occurs.

In a specific implementation process, a CA410 tool may be used to align with the screen of the second electronic device to perform data collection at a specific frequency, to obtain the brightness change curves shown in FIG. 4 obtained when the second electronic device performs the dimming mode switching. Based on the brightness change curves shown in FIG. 4, the foregoing data may be obtained.

Still referring to FIG. 4, in FIG. 4, the first time node is t1, the second time node is t2, and three time nodes located between the first time node t1 and the second time node t2 are respectively t3, t4, and t5. Screen ideal brightness B at the time node t3, screen ideal brightness C at the time node t4, and screen ideal brightness D at the time node t5 are all 90 nit. Screen actual brightness B' at the time node t3 is 97 nit; screen actual brightness C' at the time node t4 is 101 nit; and screen actual brightness D' at the time node t5 is 98 nit.

S502: Obtain screen jump brightness of the second electronic device at each time node based on the screen actual brightness and the screen ideal brightness of the second electronic device at each time node.

Screen jump brightness of the second electronic device at an ith time node in the N time nodes is a difference between screen actual brightness and screen ideal brightness at the ith time node.

FIG. 4 is still referred to, and the foregoing example is still used. Screen jump brightness (B'−B) at the time node t3 is 7 nit, screen jump brightness (C'−C) at the time node t4 is 11 nit, and screen jump brightness (D'−D) at the time node t5 is 8 nit.

S503: Obtain screen target brightness of the second electronic device at each time node based on determining of the screen ideal brightness and the screen jump brightness of the second electronic device at each time node.

Screen target brightness of the second electronic device at the ith time node is obtained based on a difference between the screen ideal brightness and the screen jump brightness that are at the ith time node, and may be the difference between the screen ideal brightness and the screen jump brightness, or may float around the difference. Specifically, it is determined based on whether screen actual brightness reaches screen ideal brightness when the second electronic device adjusts to the screen target brightness for display.

It should be noted that the screen target brightness is screen brightness that should be output by the second electronic device to enable the screen actual brightness of the second electronic device to reach the screen ideal brightness. When the second electronic device uses the original screen parameters for display, there is a case in which a TFT device causes screen actual brightness to be higher than the screen ideal brightness. Therefore, in this embodiment, the screen target brightness of the second electronic device at the ith time node is obtained based on the difference between the screen ideal brightness and the screen jump brightness that are of the second electronic device at the ith time node. In this way, when the second electronic device uses the screen target brightness for display, the screen jump brightness caused by the TFT device is superposed, and the screen actual brightness of the second electronic device approaches the screen ideal brightness. It should be understood that the first electronic device and the second electronic device are electronic devices of a same model and a same specification, and have same screen ideal brightness and same screen jump brightness. Therefore, when display is performed based on the screen target brightness, the screen ideal brightness can naturally be achieved.

FIG. 4 is still referred to, and the foregoing example is still used. Screen target brightness at the time node t3 is B''=B−(B'−B)=83 nit; screen target brightness at the time node t4 is C''=C−(C'−C)=81 nit; and screen jump brightness at the time node t5 is D''=D−(D'−D)=82 nit. Herein, only an example in which the screen target brightness is the difference between the screen ideal brightness and the screen jump brightness is used for illustration.

S504: Determine a frame quantity M of picture frames output by the second electronic device between the first time node and the second time node, where M is a positive integer greater than or equal to N.

This means that, in a specific implementation process of the frame quantity M of the picture frames output by the second electronic device between the first time node and the second time node, the frame quantity M of the picture frames output by the second electronic device between the first time node and the second time node is obtained based on an equation $M=[(t2-t1)*f_{refresh}]$, where t1 is the first time node; t2 is the second time node; and $f_{refresh}$ is a screen refresh rate of the second electronic device.

FIG. 4 is still referred to, and the foregoing example is still used. t1=0.1536 s, t2=0.3072 s, t2−t1=0.1536 s, the screen refresh rate of the second electronic device $-f_{refresh}$=60 Hz, and M=9 frames. In another embodiment, if $-f_{refresh}$=90 Hz, M=14 frames; and if $f_{refresh}$=120 Hz, M=18 frames.

S505: Determine a frame sequence number of a picture frame output by the second electronic device at each time node.

In some embodiments, first, frame display duration T of one picture frame displayed by the second electronic device may be determined based on the screen refresh rate $f_{refresh}$ of the second electronic device. Then, a display time period of each of the M picture frames is determined based on a moment at which the second electronic device detects that the dimming mode switching occurs (namely, the first time node t1), a frame sequence number, and the frame display duration T. Finally, the frame sequence number of the picture frame output by the second electronic device at each time node is: a frame sequence number of a picture frame corresponding to a display time period in which the time node is located.

For example, for a jth picture frame output after the second electronic device detects that the dimming mode switching occurs, a display time period of the jth picture frame may be: t1+(j−1)*T~t1+j*T. If the ith time node falls within the display time period t1+(j−1)*T~t1+j*T, the ith time node corresponds to the jth picture frame, namely, a frame sequence number j. Certainly, in another embodiment, the display time period of the jth picture frame may alternatively be: t1+j*T~t1+(j+1)*T.

FIG. 4 is still referred to, and the foregoing example is still used. The frame display duration T=0.016 s, t1=0.1536 s, and display time periods from a 1st frame to a 9th frame are respectively: 0.1536 s~0.1696 s (the 1st frame), 0.1696 s~0.1856 s (a 2nd frame), 0.2016 s~0.2176 s (a 3rd frame), 0.2176 s~0.2336 s (a 4th frame), 0.2336 s~0.2496 s (a 5th frame), 0.2496 s~0.2656 s (a 6th frame), 0.2656 s~0.2816 s (a 7th frame), 0.2816 s~0.2976 s (an 8th frame), and 0.2976 s~0.3136 s (the 9th frame). The time node t3=0.192 s is within 0.2016 s~0.2176 s, namely, the display time period of the 3rd frame. The time node t4=0.2378 s is within 0.2336 s~0.2496 s, namely, the display time period of the 5th frame. The time node t5=0.2688 s is within 0.2656 s~0.2816 s, namely, the display time period of the 7th frame.

S506: Obtain M screen brightness parameters based on the frame sequence number of the picture frame output by the second electronic device at each time node and the screen target brightness of the second electronic device at each time node.

It should be noted that, from S501 to S505, the frame sequence numbers of the picture frames output by the second electronic device at the N time nodes and corresponding screen target brightness may be obtained, to obtain a total of N screen brightness parameters. Each screen brightness parameter includes one frame sequence number and control information. One of the N screen brightness parameters is used as an example. A frame sequence number in the screen brightness parameter is a frame sequence number of a picture frame output by the second electronic device at the ith time node. In this case, screen brightness indicated by control information in the screen brightness parameter is the screen target brightness of the second electronic device at the ith time node. Specifically, the control information is implemented in a form of a DBV.

It should be understood that when N is less than M, remaining (M−N) screen brightness parameters need to be further determined. For ease of distinction, in this embodiment of this application, the M screen brightness parameters are divided into N first screen brightness parameters and (M−N) second screen brightness parameters. Each of the N first screen brightness parameters includes first control information corresponding to a first picture frame. It should be understood that the N first screen brightness parameters are the N screen brightness parameters, and may be implemented through reference. The (M−N) second screen brightness parameters are the remaining (M−N) screen brightness parameters, and each second screen brightness parameter includes second control information corresponding to a second picture frame. Screen brightness indicated by the second control information in each second screen brightness parameter is obtained by performing interpolation calculation based on two pieces of adjacent adjustment brightness of the second picture frame. The adjacent adjustment brightness is screen brightness indicated by first control information corresponding to a first picture frame that is adjacent to the second picture frame and that is in a plurality of first screen brightness parameters.

When N=M, the N screen brightness parameters are the M screen brightness parameters. In this case, the control information in each screen brightness parameter is obtained based on actual measured data, and is not obtained by performing an interpolation operation. Therefore, an alleviation effect on a brightness jump is better. Based on this, during performing of the method shown in FIG. 5, a larger quantity of time nodes indicates being closer to a frame quantity of picture frames in a brightness jump time period, and a better alleviation effect on a brightness jump.

The foregoing example is still used, and N=3 and M=9 in FIG. 4. In this case, three first screen brightness parameters may be obtained, which are respectively a third row, a fourth row, and a seventh row in the following Table 2. It should be noted that the screen brightness parameter herein is implemented in a form of a table. In another embodiment, an association relationship between a frame sequence number in a screen brightness parameter and a control information may alternatively be implemented in another association manner. Remaining six pieces of second brightness information are obtained based on the interpolation operation.

TABLE 2

| Nine screen brightness parameters | | |
|---|---|---|
| Frame sequence number | DBV (namely, control information) | Brightness (nit) |
| 1 | 5007 | 89 |
| 2 | 5004 | 84 |
| 3 | 5003 | 83 |
| 4 | 5002 | 82 |
| 5 | 5000 | 81 |
| 6 | 5001 | 81.5 |
| 7 | 5002 | 82 |
| 8 | 5005 | 85 |
| 9 | 5006 | 88 |

It should be understood that Table 2 may further store, in each screen brightness parameter, another parameter similar to that in Table 1, for example, a dimming mode and a duty cycle. Because the electronic device invokes the screen brightness parameter based on the DBV value, Table 2 may alternatively store only the relationship between a frame sequence number and control information. In addition, a relationship between control information and another parameter such as brightness is stored in another table. In this way, after invoking a corresponding DBV value based on the frame sequence number, the first electronic device can invoke the another parameter in the another table based on the DBV value.

It should be noted that the foregoing steps S501 to S506 may be exchanged in order adaptively. For example, before the screen target brightness at each time node is obtained, the frame quantity M of the picture frames may be obtained first. In addition, in another embodiment, the frame sequence number corresponding to the time node may be first determined. Then, the screen ideal brightness, the screen actual brightness, and the screen target brightness of the second electronic device are determined based on each frame sequence number. This is not limited in this embodiment of this application.

It should be further noted that the quantity of the screen brightness parameters obtained in the foregoing embodiment is consistent with a frame quantity of picture frames displayed by the second electronic device in the brightness jump time period, and both are M. In another embodiment, the quantity of the screen brightness parameters may alternatively be less than the frame quantity of the picture frames displayed by the second electronic device in the brightness jump time period. In this case, the first electronic device performs brightness jump alleviation only on some picture frames displayed in the brightness jump time period. Because a human eye has a persistence of vision effect, when the human eye cannot perform identification, improving only some picture frames can also alleviate a brightness jump.

After the M screen brightness parameters are obtained, the M screen brightness parameters may be stored in the first electronic device, or stored in a server, a cloud, or the like, so that the first electronic device invokes the M screen brightness parameters when performing the screen brightness adjustment method. It should be noted that data in the foregoing Table 2 is not applicable when a screen refresh rate of the first electronic device is switched, for example, switched from 60 Hz to 90 Hz or 120 Hz. Therefore, a screen brightness parameter at each screen refresh rate can be obtained based on the method shown in FIG. 5, and all screen brightness parameters are stored for invoking.

In addition, in some embodiments, each of the M screen brightness parameters may alternatively be a correspondence between a time node and control information. In this case, when displaying a picture frame, the first electronic device needs to first determine a correspondence between the picture frame and a time node, and then invoke control information corresponding to the time node. This is described in detail in subsequent embodiments. Details are not described herein.

The following describes implementations of the embodiments of this application in detail with reference to the accompanying drawings.

Figure 6:
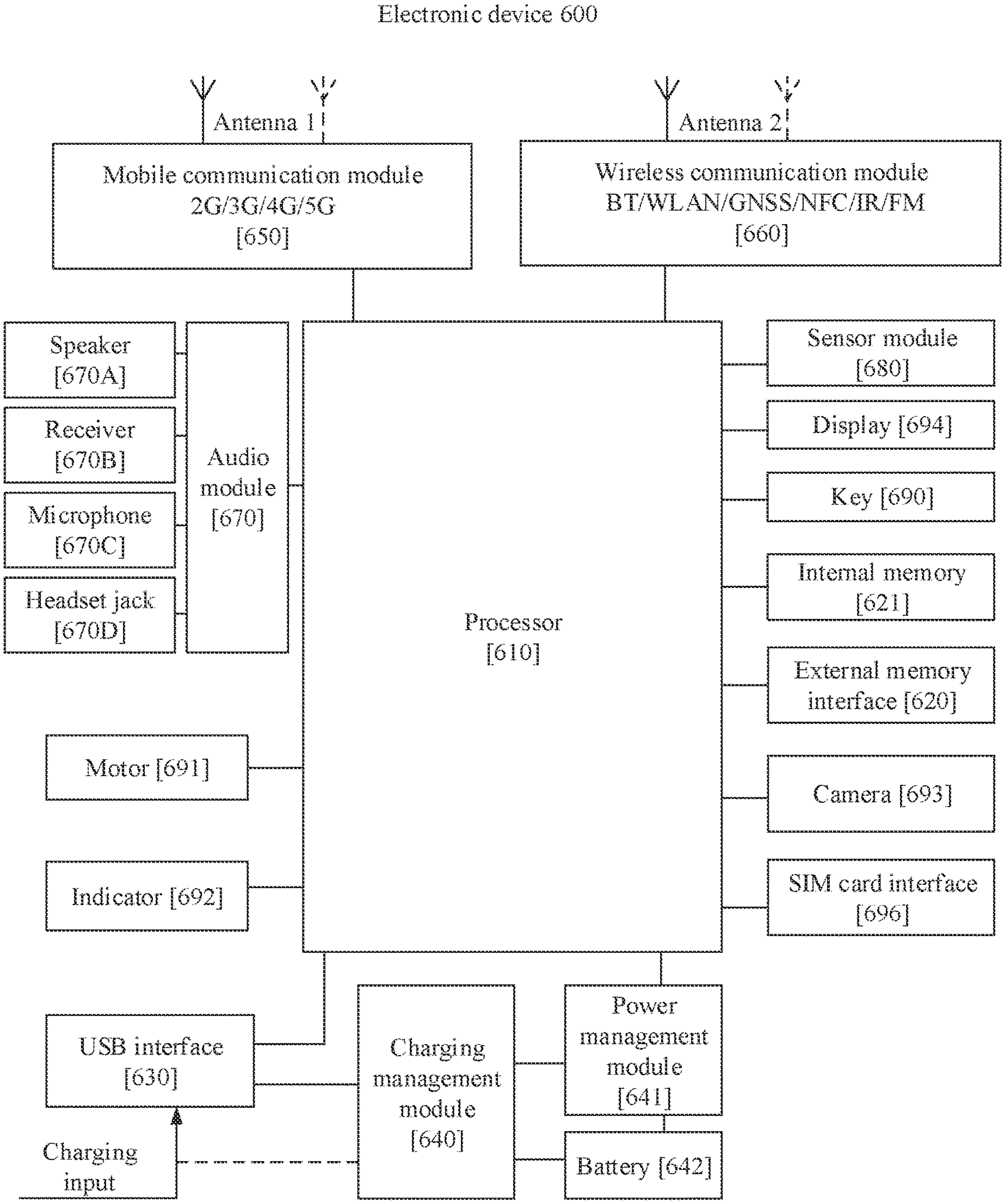
FIG. 6 is a schematic diagram of a structure of an electronic device according to an embodiment of this application.

Referring to FIG. 6, FIG. 6 is a schematic diagram of a structure of an electronic device according to an embodiment of this application. As shown in FIG. 6, an electronic device 600 may include a processor 610, an external memory interface 620, an internal memory 621, a universal serial bus (USB) interface 630, a charging management module 640, a power management module 641, a battery 642, an antenna 1, an antenna 2, a mobile communication module 650, a wireless communication module 660, an audio module 670, a speaker 670A, a receiver 670B, a microphone 670C, a headset jack 670D, a sensor module 680, a key 690, a motor 691, an indicator 692, a camera 693, a display 694, a subscriber identification module (SIM) card interface 696, and the like. The sensor module 680 may include a touch sensor and the like.

It may be understood that the structure shown in this embodiment of this application does not constitute a specific limitation on the electronic device 600. In some other embodiments, the electronic device 600 may include more or fewer components than those shown in the figure, or combine some components, or split some components, or have different component arrangements. The components shown in the figure may be implemented by using hardware, software, or a combination of software and hardware.

The processor 610 may include one or more processing units. For example, the processor 610 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and command center of the electronic device 600. The controller may generate an operation control signal based on instruction operation code and a timing signal, to control instruction fetching and instruction execution.

A memory may be further disposed in the processor 610, and is configured to store instructions and data. In some embodiments, the memory in the processor 610 is a cache memory. The memory may store instructions or data just used or cyclically used by the processor 610. If the processor 610 needs to use the instructions or the data again, the processor 610 may directly invoke the instructions or the data from the memory. This avoids repeated access and reduces a waiting time of the processor 610, thereby improving system efficiency.

In some embodiments, the processor 610 may include one or more interfaces. The interface may include an inter-integrated circuit (I2C) interface, an inter-integrated circuit sound (I2S) interface, a pulse code modulation (PCM)

interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules illustrated in this embodiment is merely an example for description, and does not constitute a limitation on the structure of the electronic device 600. In some other embodiments, the electronic device 600 may alternatively use an interface connection manner different from that in the foregoing embodiment, or use a combination of a plurality of interface connection manners.

The charging management module 640 is configured to receive a charging input from a charger. The charger may be a wireless charger or a wired charger. In some embodiments of wired charging, the charging management module 640 may receive a charging input from a wired charger through the USB interface 630. In some embodiments of wireless charging, the charging management module 640 may receive a wireless charging input by using a wireless charging coil of the electronic device 600. The charging management module 640 may further supply power to the electronic device by using the power management module 641 while charging the battery 642.

The power management module 641 is configured to be connected to the battery 642, the charging management module 640, and the processor 610. The power management module 641 receives an input from the battery 642 and/or the charging management module 640, and supplies power to the processor 610, the internal memory 621, the external memory, the display 694, the camera 693, the wireless communication module 660, and the like. The power management module 641 may be further configured to monitor parameters such as a battery capacity, a quantity of battery cycles, and a battery health status (leakage or impedance). In some other embodiments, the power management module 641 may alternatively be disposed in the processor 610. In some other embodiments, the power management module 641 and the charging management module 640 may alternatively be disposed in a same device.

A wireless communication function of the electronic device 600 may be implemented by using the antenna 1, the antenna 2, the mobile communication module 650, the wireless communication module 660, the modem processor, the baseband processor, and the like.

The antenna 1 and the antenna 2 are configured to transmit and receive electromagnetic wave signals. Each antenna in the electronic device 600 may be configured to cover one or more communication bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 650 may provide a solution applied to the electronic device 600 for wireless communication including 2G/3G/4G/5G and the like. The mobile communication module 650 may include at least one filter, a switch, a power amplifier, a low noise amplifier (LNA), and the like. The mobile communication module 650 may receive an electromagnetic wave by using the antenna 1, perform processing such as filtering and amplification on the received electromagnetic wave, and transmit a processed electromagnetic wave to the modem processor for demodulation. The mobile communication module 650 may further amplify a signal modulated by the modem processor, and convert the signal into an electromagnetic wave by using the antenna 1 for radiation. In some embodiments, at least some functional modules of the mobile communication module 650 may be disposed in the processor 610. In some embodiments, at least some functional modules of the mobile communication module 650 may be disposed in a same device as at least some modules of the processor 610.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor and then transferred to the application processor. The application processor outputs a sound signal by using an audio device (not limited to the speaker 670A, the receiver 670B, or the like), or displays an image or a video by using the display 694. In some embodiments, the modem processor may be an independent device. In some other embodiments, the modem processor may be independent of the processor 610, and the modem processor and the mobile communication module 650 or another functional module are disposed in a same device.

The wireless communication module 660 may provide a wireless communication solution that is applied to the electronic device 600, including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 660 may be one or more devices integrating at least one communication processing module. The wireless communication module 660 receives an electromagnetic wave by using the antenna 2, performs frequency modulation and filtering processing on an electromagnetic wave signal, and sends a processed signal to the processor 610. The wireless communication module 660 may further receive a to-be-sent signal from the processor 610, perform frequency modulation and amplification on the signal, and convert the signal into an electromagnetic wave by using the antenna 2 for radiation.

In some embodiments, the antenna 1 and the mobile communication module 650 in the electronic device 600 are coupled, and the antenna 2 and the wireless communication module 660 are coupled, so that the electronic device 600 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 600 implements a display function by using the GPU, the display 694, the application processor, and the like. The GPU is a microprocessor for image processing, and is connected to the display 694 and the application processor. The GPU is configured to perform mathematical and geometric computing for graphics rendering. The processor 610 may include one or more GPUs, and the one or more GPUs execute program instructions to generate or change display information.

The display 694 is configured to display an image, a video, or the like. The display 694 is sometimes also referred to as a display module, and generally includes a display panel and a drive circuit configured to drive the display panel to display. The display panel may be a liquid crystal display (LCD), an organic light-emitting diode (OLED), an active-matrix organic light emitting diode or active-matrix organic light emitting diode (AMOLED), a flex light-emitting diode (FLED), a Miniled, a MicroLed, a Micro-oLed, a quantum dot light emitting diode (QLED), or the like. A drive module includes an array that includes a display driver integrated circuit (DDIC), a TFT device, and the like.

The electronic device 600 may implement a shooting function by using the ISP, the camera 693, the video codec, the GPU, the display 694, the application processor, and the like.

The ISP is configured to process data fed back by the camera 693. For example, during photographing, a shutter is opened, and light is transmitted to a camera photosensitive element through a lens. An optical signal is converted into an electrical signal. The camera photosensitive element transmits the electrical signal to the ISP for processing, to convert the electrical signal into an image visible to naked eyes. The ISP may further perform algorithm optimization on noise, brightness, and complexion of the image. The ISP may further optimize parameters such as exposure and a color temperature of a shooting scenario. In some embodiments, the ISP may be disposed in the camera 693.

The camera 693 is configured to capture a still image or a video. An optical image is generated for an object through the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 600 may include one or N cameras 693, where N is a positive integer greater than 1.

The digital signal processor is configured to process a digital signal, and may process another digital signal in addition to the digital image signal. For example, when the electronic device 600 selects a frequency, the digital signal processor is configured to perform Fourier transform and the like on frequency energy.

The video codec is configured to compress or decompress a digital video. The electronic device 600 may support one or more video codecs. Therefore, the electronic device 600 may play or record videos in a plurality of encoding formats such as moving picture experts group (MPEG) 1, MPEG2, MPEG3, and MPEG4.

The NPU is a neural-network (NN) computing processor, which quickly processes input information by referring to a biological neural network structure, for example, by referring to a transmission mode between human brain neurons, and may further perform self-learning continuously. Applications such as intelligent recognition of the electronic device 600 can be implemented by using the NPU, for example, image recognition, face recognition, speech recognition, and text understanding.

The external memory interface 620 may be configured to connect to an external memory card, such as a Micro SD card, to extend a storage capability of the electronic device 600. The external memory card communicates with the processor 610 by using the external memory interface 620, to implement a data storage function, for example, to store files such as music and a video in the external memory card.

The internal memory 621 may be configured to store computer-executable program code, and the executable program code includes instructions. The processor 610 runs the instructions stored in the internal memory 621, to perform various function applications and data processing of the electronic device 600. For example, in this embodiment of this application, the processor 610 may detect a folding angle (namely, an included angle between adjacent screens) of the display 694 (namely, a foldable screen) by executing the instructions stored in the internal memory 621, and in response to a change of the included angle, display displayed content (namely, an image) corresponding to the included angle. The internal memory 621 may include a program storage area and a data storage area. The program storage area may store an operating system, an application required by at least one function (for example, a sound playback function or an image playback function), and the like. The data storage area may store data (such as audio data and a phone book) and the like created during use of the electronic device 600. In addition, the internal memory 621 may include a high-speed random access memory, and may further include a non-volatile memory, for example, at least one magnetic disk storage device, a flash memory device, or a universal flash storage (UFS).

The electronic device 600 may implement audio functions by using the audio module 670, the speaker 670A, the receiver 670B, the microphone 670C, the headset jack 670D, the application processor, and the like, for example, implement music playback and recording.

The audio module 670 is configured to convert digital audio information into an analog audio signal for output, and is also configured to convert an analog audio input into a digital audio signal. The audio module 670 may be further configured to encode and decode an audio signal. In some embodiments, the audio module 670 may be disposed in the processor 610 or some functional modules of the audio module 670 may be disposed in the processor 610. The speaker 670A, also referred to as a "loudspeaker", is configured to convert an audio electrical signal into a sound signal. The electronic device 600 may be used to listen to music or answer a hands-free call by using the speaker 670A. The receiver 670B, also referred to as an "earpiece", is configured to convert an audio electrical signal into a sound signal. When a call is answered or a voice message is listened to by using the electronic device 600, the receiver 670B may be put close to a human ear to listen to a voice. The microphone 670C, also referred to as a "mic" or "mike", is configured to convert a sound signal into an electrical signal. When making a call or sending a voice message or needing to trigger the electronic device 600 to perform some functions by using a voice assistant, a user may make a sound by moving a human mouth close to the microphone 670C, to input a sound signal to the microphone 670C. At least one microphone 670C may be disposed in the electronic device 600. In some other embodiments, the electronic device 600 may be provided with two microphones 670C, and may further implement a noise reduction function in addition to collecting a sound signal. In some other embodiments, three, four, or more microphones 670C may alternatively be disposed in the electronic device 600, to collect a sound signal, reduce noise, further identify a sound source, implement a directional recording function, and the like.

The headset jack 670D is configured to connect to a wired headset. The headset jack 670D may be the USB interface 630, or may be a 3.6 mm open mobile terminal platform (OMTP) standard interface or a cellular telecommunications industry association of the USA (CTIA) standard interface.

The touch sensor is also referred to as a "touch panel". The touch sensor may be disposed on the display 694. The touch sensor and the display 694 form a touchscreen, which is also referred to as a "touch control screen". The touch sensor is configured to detect a touch operation performed on or near the touch sensor. The touch sensor may transmit a detected touch operation to the application processor to determine a type of a touch event. A visual output related to the touch operation may be provided by using the display 694. In some other embodiments, the touch sensor may alternatively be disposed on a surface of the electronic device 600, and is located on a location different from that of the display 694.

The key 690 includes a power-on key, a volume key, or the like. The key 690 may be a mechanical key, or may be a touch key. The electronic device 600 may receive a key input and generate a key signal input related to user settings and function control of the electronic device 600.

The motor 691 may generate a vibration prompt. The motor 691 may be configured to provide a vibration prompt for an incoming call, and may be further configured to provide vibration feedback for a touch. For example, touch operations performed on different applications (for example, photographing and audio playback) may correspond to different vibration feedback effects. The motor 691 may also correspond to different vibration feedback effects when touch operations are performed on different areas of the display 694. Different application scenarios (for example, a time reminder, information receiving, an alarm clock, and a game) may also correspond to different vibration feedback effects. A touch vibration feedback effect may be further customized.

The indicator 692 may be an indicator light, may be configured to indicate a charging status or a power change, and may be further configured to indicate a message, a missed incoming call, a notification, and the like.

The SIM card interface 696 is configured to connect to a SIM card. The SIM card may be inserted into the SIM card interface 696 or removed from the SIM card interface 696 to implement contact with and separation from the electronic device 600. The electronic device 600 may support one or N SIM card interfaces, where N is a positive integer greater than 1. The SIM card interface 696 may support a Nano SIM card, a Micro SIM card, a SIM card, and the like. A plurality of cards may be simultaneously inserted into a same SIM card interface 696. The plurality of cards may be of a same type or different types. The SIM card interface 696 may also be compatible with SIM cards of different types. The SIM card interface 696 may be further compatible with the external memory card. The electronic device 600 interacts with a network by using the SIM card, to implement functions such as a call and data communication. In some embodiments, the electronic device 600 uses an eSIM, that is, an embedded SIM card. The eSIM card may be embedded in the electronic device 600 and cannot be separated from the electronic device 600.

Figure 7:
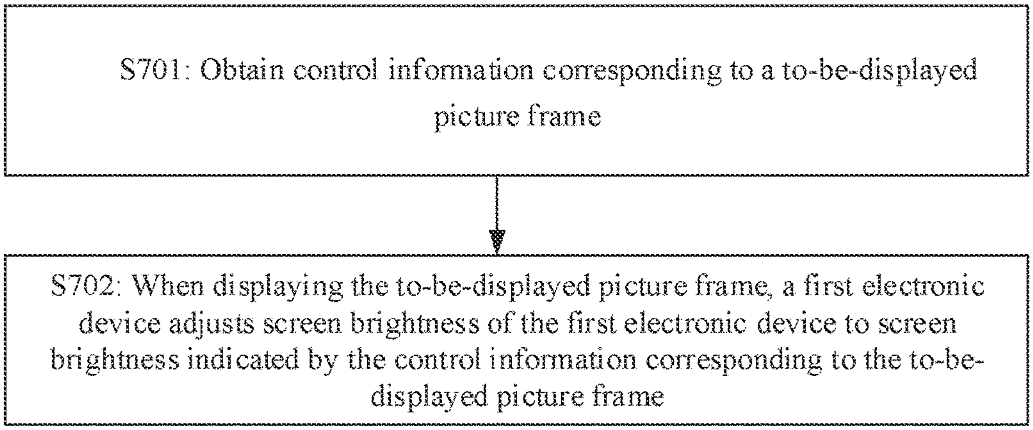
FIG. 7 is a flowchart of a screen brightness adjustment method according to an embodiment of this application.

Referring to FIG. 7, FIG. 7 is a flowchart of a screen brightness adjustment method according to an embodiment of this application, which may be applied to a first electronic device (for example, the electronic device 600). The screen brightness adjustment method includes:

S701: Obtain control information corresponding to a to-be-displayed picture frame.

The to-be-displayed picture frame is a next picture frame of a picture frame (which is subsequently referred to as a current picture frame briefly) currently being displayed by the first electronic device. In addition, the to-be-displayed picture frame is a kth picture frame obtained after the first electronic device detects that dimming mode switching occurs, where $1 \leq k \leq M$, k is a positive integer, and M is a preset positive integer.

The dimming mode switching includes switching from a PWM mode to a DC mode or switching from the DC mode to the PWM mode. In this embodiment of this application, switching from the PWM mode to the DC mode is used as an example for description. In this embodiment of this application, whether the dimming mode switching occurs is detected by detecting, in real time, a DBV value currently set for the first electronic device (the DBV value currently set herein for the first electronic device is a DBV value in an original screen brightness parameter that is used before the first electronic device triggers to perform the method in FIG. 7, and screen brightness indicated by the DBV value is a brightness value requested by an application layer in response to an operation performed by a user at the application layer), and by determining whether the DBV value meets a preset condition. Table 1 is used as an example. When detecting that the currently set DBV value is switched from DBV1289 to DBV1290, the first electronic device detects that the dimming mode switching occurs.

M may be a frame quantity of picture frames in which a brightness jump occurs after the first electronic device detects that the dimming mode switching occurs. In this way, according to the screen brightness adjustment method provided in this embodiment, jump alleviation on all picture frames in which the brightness jump occurs can be implemented. A manner of determining a value of M is already described in the embodiment shown in FIG. 5. Details are not described herein again. It should be understood that, in another embodiment, the value of M may alternatively be less than the frame quantity of the picture frames in which the brightness jump occurs after the first electronic device detects that the dimming mode switching occurs. In this case, only first some picture frames in which the brightness jump occurs after the first electronic device detects that the dimming mode switching occurs are adjusted. This is not specifically limited in this embodiment of this application. In a subsequent embodiment, an example in which M is the frame quantity of the picture frames in which the brightness jump occurs after the first electronic device detects that the dimming mode switching occurs is used for description.

Jumps may occur in first M picture frames obtained after the first electronic device detects that the dimming mode switching occurs. Therefore, in this embodiment of this application, the screen brightness adjustment method shown in FIG. 7 needs to be performed only on the to-be-displayed picture frame that belongs to these picture frames, to alleviate a brightness jump. Based on this, before displaying the to-be-displayed picture frame, the first electronic device needs to determine whether the to-be-displayed picture frame is one of the first M picture frames. If the to-be-displayed picture frame is one of the first M picture frames, the screen brightness adjustment method shown in FIG. 7 is performed.

In a specific implementation process, the first electronic device may count a displayed picture frame starting from detecting the dimming mode switching, to determine a frame sequence number k of a to-be-displayed picture frame that is to be displayed by the first electronic device. Based on whether the frame sequence number k of the to-be-displayed picture frame meets a condition 1≤k≤M, it is determined whether the to-be-displayed picture frame is one of the first M picture frames.

Figure 8A:
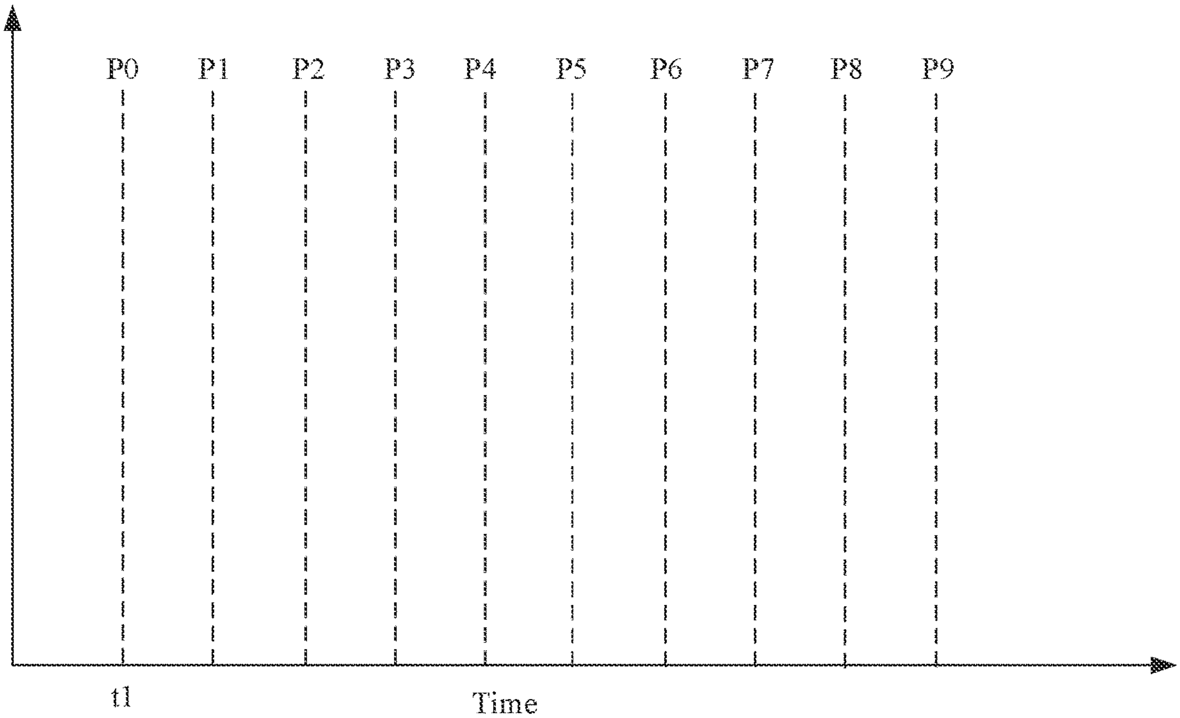
FIG. 8A is a schematic diagram of a time axis of picture frames output after a first electronic device detects dimming mode switching according to an embodiment of this application.

For example, refer to FIG. 8A. By using M=9 as an example, FIG. 8A is a schematic diagram of a time axis of picture frames output after a first electronic device detects dimming mode switching. A moment t1 is a moment at which the first electronic device detects that the dimming mode switching occurs. In this case, the current picture frame displayed by the first electronic device is P0, and P1 to P9 are nine picture frames that are sequentially output after the first electronic device detects the dimming mode switching. The first electronic device starts counting at the moment t1 at which it is detected that the dimming mode switching occurs, and 1 is accumulated every time one picture frame is output. When it is detected that the dimming mode switching occurs, a count is 1, which represents that a frame sequence number of a next to-be-displayed picture frame P1 is 1. After P1 is output, a count is 2, which represents that a frame sequence number of a next to-be-displayed picture frame P2 is 2, and so on until output of the nine picture frames is completed.

It should be noted that the foregoing action of determining whether the to-be-displayed picture frame is one of the first M picture frames may be triggered only after the first electronic device detects that the dimming mode switching occurs, and may end after the first electronic device outputs the M picture frames. To be specific, when detecting that the dimming mode switching occurs, the first electronic device starts to perform the screen brightness adjustment method shown in FIG. 7 to obtain the control information corresponding to the to-be-displayed picture frame, and k is sequentially 1, 2, . . . , and M until brightness adjustment is implemented by using the screen brightness adjustment method shown in FIG. 7 for an Mth picture frame obtained after the first electronic device detects that the dimming mode switching occurs. In this way, the brightness jump can be alleviated for all the first M picture frames obtained after it is detected that the dimming mode switching occurs. In addition, the screen brightness adjustment method starts to be performed only when it is detected that the dimming mode switching occurs. This can avoid a problem of a large data processing amount caused by always monitoring whether the to-be-displayed picture frame is one of the first M picture frames obtained after it is detected that the dimming mode switching occurs. Certainly, in another embodiment, the first electronic device may alternatively perform the foregoing action on all to-be-displayed picture frames. This is not specifically limited in this embodiment of this application.

After determining whether the to-be-displayed picture frame is one of the M picture frames, the first electronic device obtains the control information corresponding to the to-be-displayed picture frame.

The control information corresponding to the to-be-displayed picture frame is used to indicate screen brightness of the first electronic device when the first electronic device displays the to-be-displayed picture frame. It should be noted that the control information is an instruction used by the first electronic device to control screen brightness, and the first electronic device may respond to the instruction, to adjust the screen brightness to screen brightness indicated by the instruction. For example, a specific implementation form of the control information may be a DBV value. Table 2 is used as an example. The first electronic device adjusts the screen brightness to 90 nit based on DBV5000. It should be noted that screen brightness indicated by the control information is only a theoretical value. When the first electronic device performs screen brightness adjustment based on the control information, because a TFT device cannot respond instantaneously, screen actual brightness does not remain at the screen brightness indicated by the control information, but is higher than the screen brightness indicated by the control information.

Based on this, to enable the screen actual brightness of the first electronic device to reach first screen ideal brightness after the first electronic device adjusts the first electronic device based on the control information corresponding to the to-be-displayed picture frame, where the first screen ideal brightness is a preset brightness threshold (for example, 90 nit) that triggers the first electronic device to perform the dimming mode switching, in this embodiment of this application, the screen brightness indicated by the control information corresponding to the to-be-displayed picture frame is lower than the first screen ideal brightness. In this way, when the first electronic device displays the to-be-displayed picture frame, the screen brightness of the first electronic device is adjusted to the screen brightness indicated by the control information, and screen jump brightness caused by the TFT device is superposed, so that screen actual brightness finally obtained when the first electronic device displays the to-be-displayed picture frame approaches the first screen ideal brightness.

In some embodiments of this application, the first screen ideal brightness may be obtained. Therefore, the first electronic device may instantly generate the control information corresponding to the to-be-displayed picture frame based on the first screen ideal brightness, so that the screen brightness indicated by the control information corresponding to the to-be-displayed picture frame is lower than the first screen ideal brightness. As long as the screen brightness indicated by the control information corresponding to the to-be-displayed picture frame is not too low, a brightness jump phenomenon can be alleviated to some extent in this embodiment.

In some other embodiments of this application, the first electronic device may obtain the control information corresponding to the to-be-displayed picture frame based on M pre-stored screen brightness parameters. Each screen brightness parameter includes control information corresponding to one picture frame; and the to-be-displayed picture frame is a picture frame in the M screen brightness parameters.

Considering that a screen refresh rate is relatively high, in this embodiment, the following is pre-stored: control information corresponding to each of the first M picture frames obtained after the first electronic device detects that the dimming mode switching occurs. In this way, when the screen brightness adjustment manner is performed, the control information can be directly invoked from the M pre-stored screen brightness parameters. This manner helps reduce adjustment time for each picture frame in which a brightness jump occurs, to avoid freezing of the to-be-displayed picture frame due to excessively long time of obtaining the control information. It should be understood that the M screen brightness parameters in this embodiment may be those pre-stored in the embodiment shown in FIG. 5. Based on this, the M screen brightness parameters herein may have the following implementations:

For example, in the M screen brightness parameters, each screen brightness parameter may include one frame sequence number and control information, as shown in Table 2. The frame sequence number in the screen brightness parameter is used to indicate a sequence number of a picture frame output after the first electronic device detects the dimming mode switching. The control information in the screen brightness parameter is used to indicate screen brightness of the first electronic device when the first electronic device displays the picture frame corresponding to the frame sequence number.

Because the frame sequence number k of the to-be-displayed picture frame is less than or equal to M, the frame sequence number k of the to-be-displayed picture frame is one frame sequence number in the M screen brightness parameters. Based on this, in S701, the first electronic device may obtain control information corresponding to the frame sequence number k from the M screen brightness parameters based on the frame sequence number k of the to-be-displayed picture frame, and the control information corresponding to the frame sequence number k is the control information corresponding to the to-be-displayed picture frame. Correspondingly, in S702, when displaying the to-be-displayed picture frame, the first electronic device adjusts the screen brightness of the first electronic device to screen brightness indicated by the control information corresponding to the frame sequence number k.

For example, in the M screen brightness parameters, each screen brightness parameter may further include one time node and control information. The time node is used to indicate a moment obtained after the first electronic device detects the dimming mode switching. The control information is used to indicate screen brightness of the first electronic device at the time node.

Because the frame sequence number k of the to-be-displayed picture frame is less than or equal to M, there is a time node that falls into a display time period of the to-be-displayed picture frame in the M screen brightness parameters. Based on this, before obtaining the to-be-displayed picture frame, the first electronic device may first determine the time node that falls into the display time period of the to-be-displayed picture frame. It is assumed that the time node that falls into the display time period of the to-be-displayed picture frame is a third time node. In S701, the first electronic device may obtain control information corresponding to the third time node from the M screen brightness parameters based on the third time node corresponding to the to-be-displayed picture frame. The control information corresponding to the third time node is the control information corresponding to the to-be-displayed picture frame. Correspondingly, in S702, when displaying the to-be-displayed picture frame, the first electronic device adjusts the screen brightness of the first electronic device to screen brightness indicated by the control information corresponding to the third time node.

In a specific implementation process, a manner in which the first electronic device determines the third time node that falls into the display time period of the to-be-displayed picture frame is as follows:

Frame display duration of one picture frame of the first electronic device is determined based on a current screen refresh rate of the first electronic device.

The display time period of the to-be-displayed picture frame is determined based on a moment at which the first electronic device detects that the dimming mode switching occurs, the frame sequence number of the to-be-displayed picture frame, and the frame display duration. A time node that is in the M screen brightness parameters and that is in the display time period of the to-be-displayed picture frame is the third time node corresponding to the to-be-displayed picture frame.

It should be noted that this process is similar to a process in which the frame sequence number of the picture frame output by the second electronic device at each time node is determined in S505. For a specific implementation, refer to S505. Details are not described herein again.

In some design manners of this application, the control information corresponding to the picture frame in the M screen brightness parameters is obtained by calculating second screen ideal brightness and second screen actual brightness of a second electronic device when the dimming mode switching occurs. The second screen ideal brightness is a preset brightness threshold (for example, 90 nit) that triggers the second electronic device to perform the dimming mode switching. The second screen actual brightness is an actual brightness value obtained when the second electronic device displays the picture frame. The screen brightness indicated by the control information in each screen brightness parameter is obtained based on a difference between the second screen ideal brightness and second screen jump brightness. The second screen jump brightness is a difference between the second screen actual brightness and the second screen ideal brightness.

It should be understood that, to achieve an effect of alleviating or even eliminating the brightness jump, it is very critical to adjust screen brightness obtained when the first electronic device displays a picture frame. If a reduction amount is too small or too large, alleviation cannot be achieved, or even a more severe brightness jump may occur. To better eliminate the brightness jump phenomenon, a difference between the first screen ideal brightness and the screen brightness obtained when the first electronic device displays the picture frame (namely, the screen brightness indicated by the control information) preferably approaches first screen jump brightness. That is, an adjustment amount is exactly screen jump brightness of the first electronic device. In this case, the screen actual brightness obtained when the first electronic device displays the picture frame can approach the screen ideal brightness.

To make the difference between the first screen ideal brightness and the screen brightness indicated by the control information preferably approach the first screen jump brightness, in this embodiment, the second screen jump brightness of the second electronic device obtained when the dimming mode switching occurs is obtained based on the second screen ideal brightness and the second screen actual brightness of the second electronic device obtained when the dimming mode switching occurs, where the second electronic device uses a same specification and type of original screen brightness parameter. In addition, the control information is obtained based on the difference between the second screen ideal brightness and the second screen jump brightness that are of the second electronic device. Therefore, a difference between the second screen ideal brightness and the screen brightness indicated by the obtained control information approaches the second screen jump brightness. The second electronic device is an electronic device of a same specification and type as the first electronic device. Therefore, the first electronic device and the second electronic device have consistent screen ideal brightness (that is, the first screen ideal brightness and the second screen ideal brightness are the same) after it is detected that the dimming mode switching occurs. Frame sequence numbers of picture frames output at a same time node are consistent, and screen jump brightness is consistent. Therefore, when being used to control screen brightness of the first electronic device, the control information obtained based on the second electronic device can also enable a screen brightness adjustment amount of the first electronic device to be exactly the screen jump brightness of the first electronic device. In this case, the screen actual brightness obtained when the first electronic device displays the picture frame can approach the screen ideal brightness.

In addition, in this embodiment, the screen brightness indicated by the control information in each screen brightness parameter is obtained based on the difference between the second screen ideal brightness and the second screen jump brightness. In this way, it is equivalent to that control information corresponding to the first M picture frames obtained after the second electronic device detects that the dimming mode switching occurs is obtained based on an actual measured difference between the second screen ideal brightness and the second screen jump brightness. In this way, when being used for adjusting the first M picture frames obtained after the first electronic device detects that the dimming mode switching occurs, the control information corresponding to each picture frame is obtained based on actual measurement. Therefore, an effect of alleviating a jump is better.

In some other design manners of this application, the M screen brightness parameters include a plurality of first screen brightness parameters and at least one second screen brightness parameter. Each first screen brightness parameter includes first control information corresponding to a first picture frame. Each second screen brightness parameter includes second control information corresponding to a second picture frame. The first control information is obtained by calculating second screen ideal brightness and second screen actual brightness of the second electronic device when the dimming mode switching occurs. The second screen ideal brightness is a brightness value set by the user for a screen of the second electronic device; and the second screen actual brightness is an actual brightness value obtained when the second electronic device displays the first picture frame. Screen brightness indicated by the first control information in each first screen brightness parameter is obtained based on a difference between the second screen ideal brightness and second screen jump brightness; and the second screen jump brightness is a difference between the second screen actual brightness and the second screen ideal brightness. Screen brightness indicated by the second control information in each second screen brightness parameter is obtained by performing interpolation calculation based on two pieces of adjacent adjustment brightness of the second picture frame; and the adjacent adjustment brightness is screen brightness indicated by first control information corresponding to a first picture frame that is adjacent to the second picture frame and that is in the plurality of first screen brightness parameters.

In this embodiment, some control information is obtained based on actual measured data, and remaining control information is obtained based on an interpolation operation. This can avoid obtaining too much data and increasing a calculation amount. In addition, obtaining time of the M screen brightness parameters can be reduced, and obtaining difficulty is reduced.

A process of specifically obtaining the M screen brightness parameters is described in detail in the embodiment in FIG. 5. Details are not described herein again.

In some embodiments of this application, the M screen brightness parameters are one of a plurality of groups of screen brightness parameters; and one group of the screen brightness parameters corresponds to one screen refresh rate. The M screen brightness parameters are a group of screen brightness parameters corresponding to the current screen refresh rate of the first electronic device.

It should be understood that, when the current screen refresh rate of the first electronic device is different, the frame quantity M of the picture frames in which the brightness jump occurs after the first electronic device detects that the dimming mode switching occurs is inconsistent, and screen jump brightness corresponding to each frame is also different. Considering that the first electronic device may switch between a plurality of screen refresh rates, screen brightness parameters corresponding to each screen refresh rate are provided in this embodiment.

S702: When displaying the to-be-displayed picture frame, the first electronic device adjusts screen brightness of the first electronic device to the screen brightness indicated by the control information corresponding to the to-be-displayed picture frame.

It should be understood that any one of the first M picture frames output after the first electronic device detects that the dimming mode switching occurs meets a condition for triggering performing of the screen brightness adjustment method shown in FIG. 7. Therefore, brightness jump alleviation can be performed on all the first M picture frames obtained after the first electronic device detects that the dimming mode switching occurs. As shown in FIG. 4, in a brightness jump time period, a brightness change curve obtained after alleviation (namely, a screen actual brightness curve) basically matches a screen ideal brightness curve.

It should be noted that the control information in the screen brightness adjustment method shown in FIG. 7 is used only to adjust the first M picture frames output after the first electronic device detects that the dimming mode switching occurs. Another picture frame output by the first electronic device is still controlled by using the original screen brightness parameter. For example, in the embodiment shown in FIG. 2A and FIG. 2B, the brightness block 2012 slides to the location B (90 nit, which is a node for dimming mode switching). In this case, the first M picture frames output after the first electronic device detects that the dimming mode switching occurs are adjusted by using the screen brightness adjustment method shown in FIG. 7, and a subsequent picture frame output after the first electronic device detects that the dimming mode switching occurs is adjusted to 90 nit by using the original screen brightness parameter.

Figure 8B:
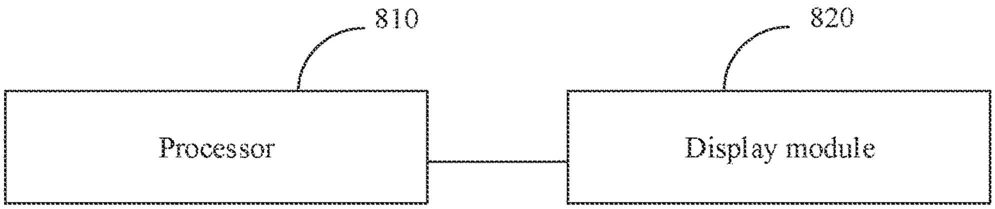
FIG. 8B is a schematic diagram of a structure of an electronic device according to an embodiment of this application.

Referring to FIG. 8B, FIG. 8B is a schematic diagram of a structure of an electronic device according to some other embodiments of this application. The electronic device 800 may be implemented as the electronic device 600 having the foregoing hardware structure, and is used as the first electronic device in FIG. 7 to perform the screen brightness adjustment method shown in FIG. 7.

As shown in FIG. 8B, the electronic device 800 may include a processor 810 and a display module 820. The display module 820 is coupled to the processor 810. It may be understood that when the electronic device 800 is the electronic device 600 shown in FIG. 6, the processor 810 may be the processor 600 shown in FIG. 6, and the display module 820 may be the display 694 shown in FIG. 6.

Certainly, components in the electronic device 800 include but are not limited to the foregoing components. For example, the electronic device 800 may further include a battery and a power management module. The power management module is configured to receive an input of the battery, and supply power to components such as the processor 810 and the display module 820.

Figure 10:
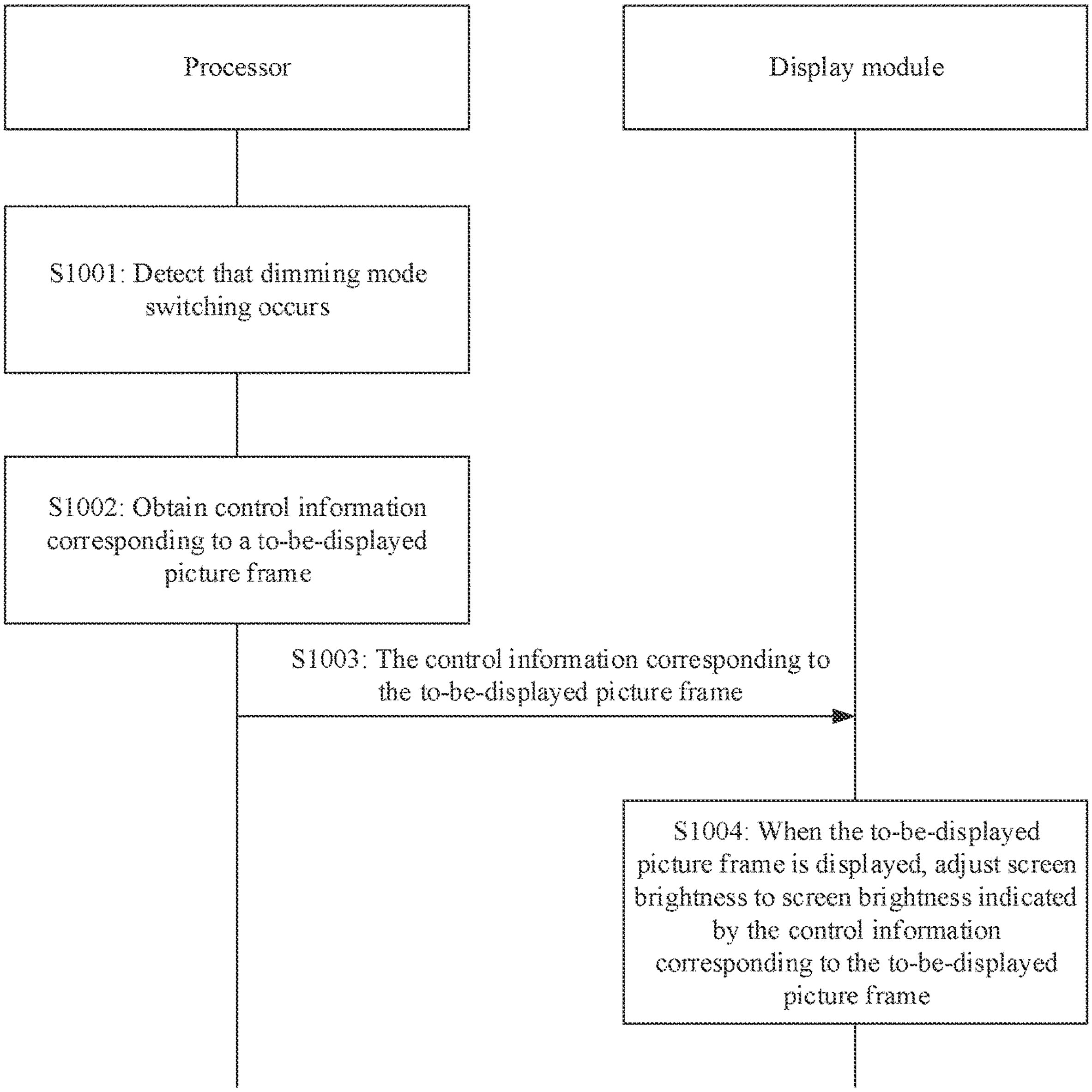
FIG. 10 is an interaction flowchart of a screen brightness adjustment method according to an embodiment of this application.
Figure 11:
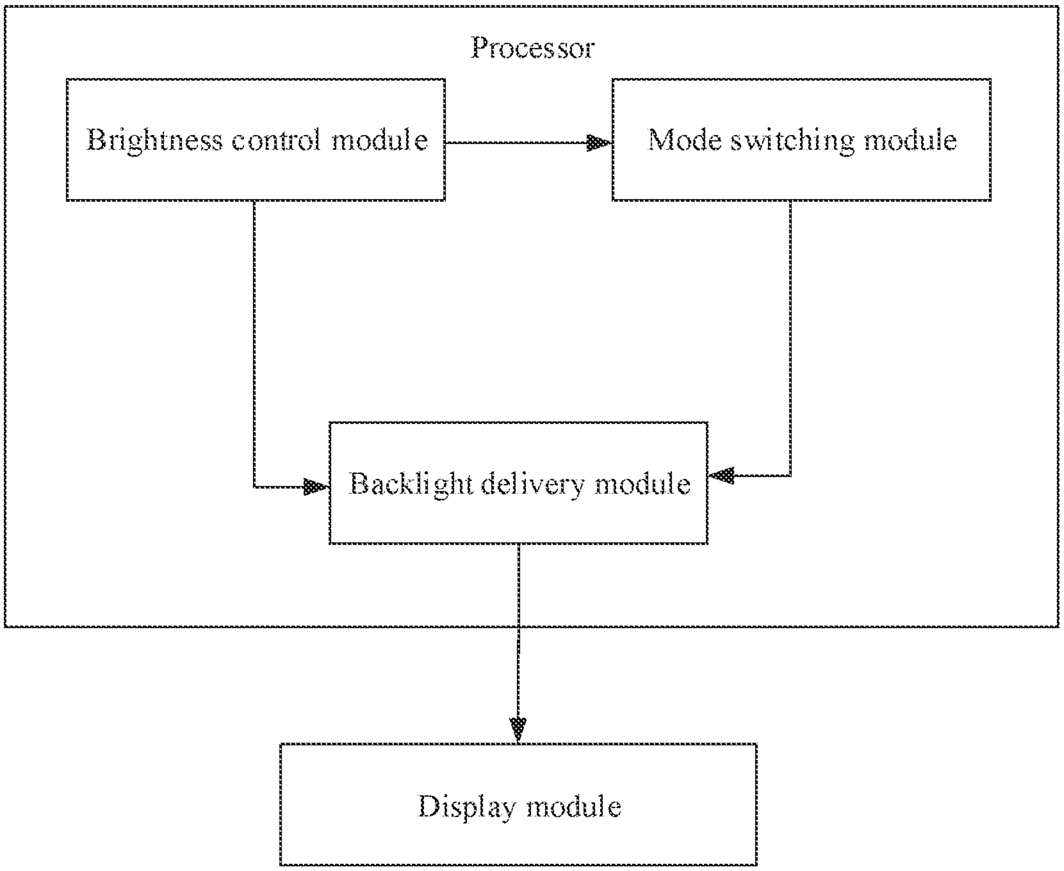
FIG. 11 is a diagram of an architecture of a processor according to an embodiment of this application.
Figure 12:
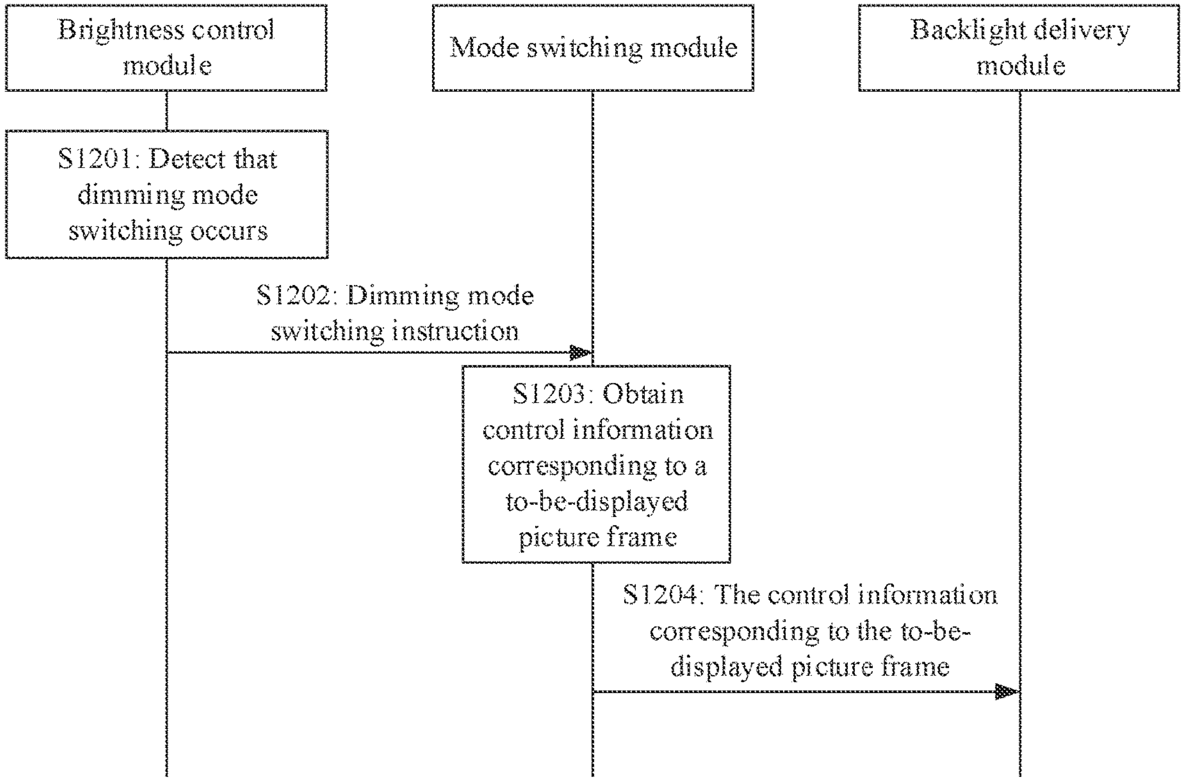
FIG. 12 is an interaction flowchart of a screen brightness adjustment method performed by an internal functional module of a processor according to an embodiment of this application.

In a specific implementation process, some steps in the foregoing screen brightness adjustment method may be performed by using the processor shown in FIG. 8B, or may be performed by using the display module shown in FIG. 8B, which is described in the following with reference to FIG. 9 to FIG. 12. It should be noted that screen brightness adjustment methods shown in FIG. 9, FIG. 10, and FIG. 12 are examples in which detecting occurrence of dimming mode switching is used as a trigger condition.

Figure 9:
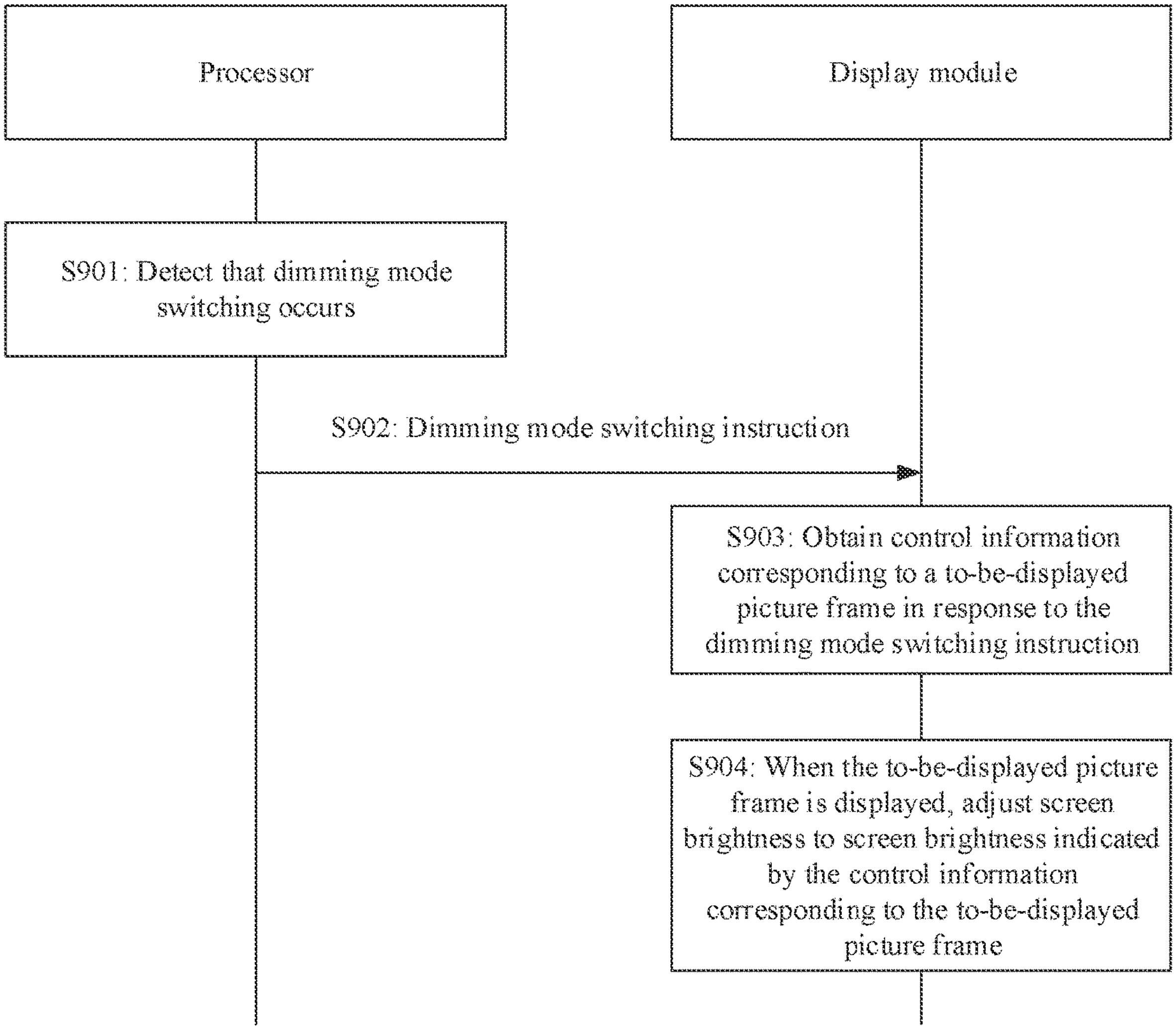
FIG. 9 is an interaction flowchart of a screen brightness adjustment method according to an embodiment of this application.

Referring to FIG. 9, FIG. 9 is an interaction flowchart of a screen brightness adjustment method according to an embodiment of this application. The screen brightness adjustment method includes:

S901: The processor detects that dimming mode switching occurs.

The processor may determine, by detecting a currently set DBV value, whether the dimming mode switching occurs. A specific detection process is described in the screen brightness adjustment method shown in FIG. 7. Details are not described herein again.

S902: The processor sends a dimming mode switching instruction to the display module, and the display module receives the dimming mode switching instruction from the processor.

The dimming mode switching instruction is used to instruct the display module to perform the dimming mode switching. For example, the dimming mode switching instruction may be bit 1 or bit 0.

When detecting that the dimming mode switching occurs, the processor sends the dimming mode switching instruction to the display module, to prompt the display module to perform screen adjustment based on a new screen brightness parameter instead of an original screen parameter when performing the dimming mode switching.

S903: The display module obtains control information corresponding to a to-be-displayed picture frame in response to the dimming mode switching instruction.

It should be understood that how to obtain the control information corresponding to the to-be-displayed picture frame is described in detail in the embodiment shown in FIG. 7. Details are not described herein again.

It may be learned from content in FIG. 7 that a brightness jump occurs in first M picture frames obtained after the processor detects that the dimming mode switching occurs. Therefore, the first M picture frames obtained after the processor detects that the dimming mode switching occurs are to-be-displayed picture frames that need to be adjusted. Therefore, before obtaining the control information corresponding to the to-be-displayed picture frame, the display module needs to determine whether the to-be-displayed picture frame is one of the first M picture frames obtained after it is detected that the dimming mode switching occurs. For details, refer to the descriptions in FIG. 7. Details are not described herein again.

In a specific implementation process, the foregoing actions executed by the display module are executed by a display driver integrated circuit (DDIC) in the display module.

S904: When displaying the to-be-displayed picture frame, the display module adjusts screen brightness to screen brightness indicated by the control information corresponding to the to-be-displayed picture frame.

In a specific implementation process, the DDIC in the display module obtains corresponding parameters, for example, a duty cycle and a dimming mode, based on the control information corresponding to the to-be-displayed picture frame, and adjusts screen brightness of a display panel in the display module to the screen brightness indicated by the control information corresponding to the to-be-displayed picture frame.

It should be noted that after S904 is performed, it may be further determined whether a next to-be-displayed picture frame is one of the first M picture frames obtained after the processor detects that the dimming mode switching occurs. If the next to-be-displayed picture frame is one of the first M picture frames obtained after the processor detects that the dimming mode switching occurs, the foregoing S903 and S904 are repeatedly performed until the first M picture frames obtained after the processor detects that the dimming mode switching occurs are all adjusted.

Referring to FIG. 10, FIG. 10 is an interaction flowchart of a screen brightness adjustment method according to an embodiment of this application. The screen brightness adjustment method includes:

S1001: The processor detects that dimming mode switching occurs.

For this step, refer to S901. Details are not described herein again.

S1002: The processor obtains control information corresponding to a to-be-displayed picture frame.

It should be understood that how to obtain the control information corresponding to the to-be-displayed picture frame is described in detail in the embodiment shown in FIG. 7. Details are not described herein again.

It should be noted that the control information corresponding to the to-be-displayed picture frame may be stored in a RAM of the processor, or may be stored in another memory.

S1003: The processor sends the control information corresponding to the to-be-displayed picture frame to the display module, and the display module receives the control information corresponding to the to-be-displayed picture frame from the processor.

S1004: When displaying the to-be-displayed picture frame, the display module adjusts screen brightness to screen brightness indicated by the control information corresponding to the to-be-displayed picture frame.

In a specific implementation process, a DDIC in the display module obtains corresponding parameters, for example, a duty cycle and a dimming mode, based on the control information corresponding to the to-be-displayed picture frame, and adjusts screen brightness of a display panel in the display module to the screen brightness indicated by the control information corresponding to the to-be-displayed picture frame.

It should be noted that after S1004 is performed, it may be further determined whether a next to-be-displayed picture frame is one of the first M picture frames obtained after the processor detects that the dimming mode switching occurs. If yes, the foregoing S1002 to S1004 are repeatedly performed until the first M picture frames obtained after the processor detects that the dimming mode switching occurs are all adjusted.

It may be learned that a difference between FIG. 10 and FIG. 9 lies in that an action executor that obtains the control information corresponding to the to-be-displayed picture frame changes.

It should be noted that in the screen brightness adjustment method in FIG. 10, the processor may be further divided based on functional modules, so that different functional modules perform the method steps performed by the processor in FIG. 10. Referring to FIG. 11, FIG. 11 is a diagram of an architecture of a processor according to an embodiment of this application. The processor includes a brightness control module, a mode switching module, and a backlight delivery module. The brightness control module is coupled to the mode switching module. The backlight delivery module is separately coupled to the brightness control module and the mode switching module, and the backlight delivery module is configured to be coupled to the display module.

Referring to FIG. 12, FIG. 12 is an interaction flowchart of a screen brightness adjustment method performed by an internal functional module of a processor according to an embodiment of this application. The method includes:

S1201: The brightness control module detects that dimming mode switching occurs.

That is, S1001 in FIG. 10 is implemented by the brightness control module in the processor by performing S1201.

S1202: The brightness control module sends a dimming mode switching instruction to the mode switching module, and the mode switching module receives the dimming mode switching instruction from the brightness control module.

The dimming mode switching instruction is used to instruct to perform the dimming mode switching. For example, the dimming mode switching instruction may be bit 1 or bit 0.

When detecting that the dimming mode switching occurs, the processor sends the dimming mode switching instruction to the display module, to prompt the display module to perform screen adjustment based on a new screen brightness parameter instead of an original screen parameter when performing the dimming mode switching.

S1203: The mode switching module obtains control information corresponding to a to-be-displayed picture frame in response to the dimming mode switching instruction.

S1204: The mode switching module sends the control information corresponding to the to-be-displayed picture frame to the backlight delivery module, and the backlight delivery module receives the control information corresponding to the to-be-displayed picture frame from the mode switching module.

That is, S1002 in FIG. 10 is implemented by the brightness control module and the mode switching module in the processor by performing S1202 to S1204.

After receiving the control information corresponding to the to-be-displayed picture frame, the backlight delivery module delivers the control information corresponding to the to-be-displayed picture frame to the display module shown in FIG. 11. When displaying the to-be-displayed picture frame, the display module adjusts screen brightness to screen brightness indicated by the control information corresponding to the to-be-displayed picture frame. That is, S1003 in FIG. 10 is performed by the backlight delivery module in the processor.

It should be noted that a purpose of coupling the brightness control module in FIG. 11 to the backlight delivery module is that, when the first electronic device is not in a dimming mode switching phase but is in a normal display phase, control information in the original screen parameter is directly sent to the backlight delivery module, instead of enabling the mode switching module to perform screen adjustment by invoking the new screen brightness parameter.

An embodiment of this application further provides an electronic device, including a display module, a memory, and a processor. The display module and the memory are coupled to the processor. The memory stores computer program code, the computer program code includes computer instructions, and when the computer instructions are executed by the processor, the electronic device is enabled to perform the method in the embodiment shown in FIG. 7.

An embodiment of this application further provides a computer-readable storage medium, including computer instructions. When the computer instructions are run on an electronic device, the electronic device is enabled to perform the method in the embodiment shown in FIG. 7.

The foregoing descriptions are merely specific implementations of this application, but are not intended to limit the protection scope of this application. Any change or replacement made within the technical scope disclosed in this application shall fall within the protection scope of this application. Therefore, the protection scope of this application shall be subject to the protection scope of the claims.

What is claimed is:

1. A screen brightness adjustment method, applied to a first electronic device, wherein the method comprises:

obtaining, by the first electronic device, control information corresponding to a to-be-displayed picture frame, wherein the to-be-displayed picture frame is a kth picture frame obtained after the first electronic device detects that dimming mode switching occurs, wherein $1 \le k \le M$, k is a positive integer, and M is a preset positive integer, wherein the control information corresponding to the to-be-displayed picture frame is used to indicate a screen brightness of the first electronic device when the first electronic device displays the to-be-displayed picture frame, wherein the screen brightness indicated by the control information corresponding to the to-be-displayed picture frame is lower than a first screen ideal brightness, wherein the first screen ideal brightness is a preset brightness threshold that triggers the first electronic device to perform the dimming mode switching, and wherein the dimming mode switching comprises switching from a pulse width modulation (PWM) mode to a direct current (DC) mode or switching from the DC mode to the PWM mode; and when displaying the to-be-displayed picture frame, adjusting, by the first electronic device, the screen brightness of the first electronic device to the screen brightness indicated by the control information corresponding to the to-be-displayed picture frame;

wherein the obtaining the control information corresponding to the to-be-displayed picture frame comprises: obtaining the control information corresponding to the to-be-displayed picture frame from M pre-stored screen brightness parameters, wherein each screen brightness parameter of the M pre-stored screen brightness parameters comprises control information corresponding to one picture frame, and the to-be-displayed picture frame is a picture frame in the M screen brightness parameters;

wherein the control information is obtained by calculating a second screen ideal brightness and a second screen actual brightness of a second electronic device when the dimming mode switching occurs, wherein the second screen ideal brightness is a preset brightness threshold that triggers the second electronic device to perform the dimming mode switching, and wherein the second screen actual brightness is an actual brightness value obtained when the second electronic device displays the picture frame; and wherein the screen brightness indicated by the control information in each screen brightness parameter of the M pre-stored screen brightness parameters is obtained based on a difference between the second screen ideal brightness and a second screen jump brightness, and the second screen jump brightness is a difference between the second screen actual brightness and the second screen ideal brightness.

2. The screen brightness adjustment method according to claim 1, wherein the M pre-stored screen brightness parameters comprise a plurality of first screen brightness parameters and at least one second screen brightness parameter, each first screen brightness parameter of the plurality of first screen brightness parameters comprises first control information corresponding to a first picture frame, and each second screen brightness parameter of the at least one second screen brightness parameter comprises second control information corresponding to a second picture frame;

wherein the first control information is obtained by calculating a second screen ideal brightness and a second screen actual brightness of a second electronic device when the dimming mode switching occurs, the second screen ideal brightness is a preset brightness threshold that triggers the second electronic device to perform the dimming mode switching, and the second screen actual brightness is an actual brightness value obtained when the second electronic device displays the first picture frame;

wherein a screen brightness indicated by the first control information in each first screen brightness parameter of the plurality of first screen brightness parameters is obtained based on a difference between the second screen ideal brightness and a second screen jump brightness, and the second screen jump brightness is a difference between the second screen actual brightness and the second screen ideal brightness; and wherein screen brightness indicated by the second control information in each second screen brightness parameter of the at least one second screen brightness parameter is obtained by performing interpolation calculation based on two pieces of adjacent adjustment brightness of the second picture frame, and the adjacent adjustment brightness is a screen brightness indicated by first control information corresponding to a first picture frame that is adjacent to the second picture frame and that is in the plurality of first screen brightness parameters.

3. The screen brightness adjustment method according to claim 1, wherein a frame quantity of picture frames output by the second electronic device between a first time node and a second time node is M; and wherein the first time node is a moment at which the screen brightness of the second electronic device starts to jump when the second electronic device detects that the dimming mode switching occurs, and the second time node is a moment at which the screen brightness of the second electronic device stops jumping when the second electronic device detects that the dimming mode switching occurs.

4. The screen brightness adjustment method according to claim 3, wherein the frame quantity M of picture frames output by the second electronic device between the first time node and the second time node is obtained based on an equation $M=[(t2-t1)*f_{refresh}]$, wherein t1 is the first time node, t2 is the second time node, and $f_{refresh}$ is a screen refresh rate of the second electronic device.

5. The screen brightness adjustment method according to claim 1, wherein the screen brightness parameter comprises a frame sequence number and control information, wherein the frame sequence number is used to indicate a sequence number of the picture frame output after the first electronic device detects the dimming mode switching, wherein the control information is used to indicate screen brightness of the first electronic device when the first electronic device displays a picture frame corresponding to the frame sequence number, wherein a frame sequence number of the to-be-displayed picture frame is k, and wherein the control information corresponding to the to-be-displayed picture frame is control information corresponding to the frame sequence number k; and wherein the adjusting the screen brightness of the first electronic device to the screen brightness indicated by the control information corresponding to the to-be-displayed picture frame comprises:

adjusting the screen brightness of the first electronic device to the screen brightness indicated by the control information corresponding to the frame sequence number k.

6. The screen brightness adjustment method according to claim 1, wherein the M pre-stored screen brightness parameters are one group of a plurality of groups of screen brightness parameters, and one group of the screen brightness parameters corresponds to one screen refresh rate; and wherein the M pre-stored screen brightness parameters are a group of screen brightness parameters corresponding to a current screen refresh rate of the first electronic device.

7. The screen brightness adjustment method according to claim 1, wherein when detecting that the dimming mode switching occurs, the first electronic device obtains the control information corresponding to the to-be-displayed picture frame, wherein k is sequentially 1, 2, . . . , and M.

8. An electronic device, comprising:

a display;

a memory; and a processor, wherein the display and the memory are coupled to the processor;

wherein the memory stores computer program code, the computer program code comprises computer instructions, and when the computer instructions are executed by the processor, the electronic device is enabled to perform operations comprising:

obtaining control information corresponding to a to-be-displayed picture frame, wherein the to-be-displayed picture frame is a kth picture frame obtained after the electronic device detects that dimming mode switching occurs, wherein $1 \le k \le M$, k is a positive integer, and M is a preset positive integer, wherein the control information corresponding to the to-be-displayed picture frame is used to indicate a screen brightness of the electronic device when the electronic device displays the to-be-displayed picture frame, wherein the screen brightness indicated by the control information corresponding to the to-be-displayed picture frame is lower than a first screen ideal brightness, wherein the first screen ideal brightness is a preset brightness threshold that triggers the electronic device to perform the dimming mode switching, and wherein the dimming mode switching comprises switching from a pulse width modulation (PWM) mode to a direct current (DC) mode or switching from the DC mode to the PWM mode; and when displaying the to-be-displayed picture frame on the display, adjusting screen brightness of the electronic device to the screen brightness indicated by the control information corresponding to the to-be-displayed picture frame;

wherein the obtaining the control information corresponding to the to-be-displayed picture frame comprises: obtaining the control information corresponding to the to-be-displayed picture frame from M pre-stored screen brightness parameters, wherein each screen brightness parameter of the M pre-stored screen brightness parameters comprises control information corresponding to one picture frame, and the to-be-displayed picture frame is a picture frame in the M screen brightness parameters;

wherein the control information is obtained by calculating a second screen ideal brightness and a second screen actual brightness of a second electronic device when the dimming mode switching occurs, the second screen ideal brightness is a preset brightness threshold that triggers the second electronic device to perform the dimming mode switching, and the second screen actual brightness is an actual brightness value obtained when the second electronic device displays the picture frame; and wherein the screen brightness indicated by the control information in each screen brightness parameter of the M pre-stored screen brightness parameters is obtained based on a difference between the second screen ideal brightness and a second screen jump brightness, and the second screen jump brightness is a difference between the second screen actual brightness and the second screen ideal brightness.

9. The electronic device according to claim 8, wherein a frame quantity of picture frames output by the second electronic device between a first time node and a second time node is M; and wherein the first time node is a moment at which the screen brightness of the second electronic device starts to jump when the second electronic device detects that the dimming mode switching occurs, and the second time node is a moment at which the screen brightness of the second electronic device stops jumping when the second electronic device detects that the dimming mode switching occurs.

10. The electronic device according to claim 8, wherein the M pre-stored screen brightness parameters comprise a plurality of first screen brightness parameters and at least one second screen brightness parameter, wherein each first screen brightness parameter of the plurality of first screen brightness parameters comprises first control information corresponding to a first picture frame, and each second screen brightness parameter of the at least one second screen brightness parameter comprises second control information corresponding to a second picture frame.

11. The electronic device according to claim 10, wherein the first control information is obtained by calculating a second screen ideal brightness and a second screen actual brightness of a second electronic device when the dimming mode switching occurs, wherein the second screen ideal brightness is a preset brightness threshold that triggers the second electronic device to perform the dimming mode switching, and wherein the second screen actual brightness is an actual brightness value obtained when the second electronic device displays the first picture frame; and wherein the screen brightness indicated by the first control information in each first screen brightness parameter of the plurality of first screen brightness parameters is obtained based on a difference between the second screen ideal brightness and a second screen jump brightness, and the second screen jump brightness is a difference between the second screen actual brightness and the second screen ideal brightness.

12. The electronic device according to claim 11, wherein a screen brightness indicated by the second control information in each second screen brightness parameter of the at least one second screen brightness parameter is obtained by performing interpolation calculation based on two pieces of adjacent adjustment brightness of the second picture frame, and the adjacent adjustment brightness is screen brightness indicated by first control information corresponding to a first picture frame that is adjacent to the second picture frame and that is in the plurality of first screen brightness parameters.

13. The electronic device according to claim 8, wherein the screen brightness parameter comprises a frame sequence number and control information, wherein the frame sequence number is used to indicate a sequence number of the picture frame output after the electronic device detects the dimming mode switching, wherein the control information is used to indicate screen brightness of the electronic device when the electronic device displays a picture frame corresponding to the frame sequence number, wherein a frame sequence number of the to-be-displayed picture frame is k and wherein the control information corresponding to the to-be-displayed picture frame is control information corresponding to the frame sequence number k; and wherein the adjusting the screen brightness of the electronic device to the screen brightness indicated by the control information corresponding to the to-be-displayed picture frame comprises:

adjusting the screen brightness of the electronic device to the screen brightness indicated by the control information corresponding to the frame sequence number k.

14. The electronic device according to claim 8, wherein the M pre-stored screen brightness parameters are one group of a plurality of groups of screen brightness parameters, and one group of the screen brightness parameters corresponds to one screen refresh rate; and wherein the M pre-stored screen brightness parameters are a group of screen brightness parameters corresponding to a current screen refresh rate of the electronic device.

15. The electronic device according to claim 8, wherein when detecting that the dimming mode switching occurs, the electronic device obtains the control information corresponding to the to-be-displayed picture frame, wherein k is sequentially 1, 2, . . . , and M.

16. A screen brightness adjustment method, applied to a first electronic device, wherein the method comprises:

obtaining, by the first electronic device, control information corresponding to a to-be-displayed picture frame, wherein the to-be-displayed picture frame is a kth picture frame obtained after the first electronic device detects that dimming mode switching occurs, wherein 1≤k≤M, k is a positive integer, and M is a preset positive integer, wherein the control information corresponding to the to-be-displayed picture frame is used to indicate a screen brightness of the first electronic device when the first electronic device displays the to-be-displayed picture frame, wherein the screen brightness indicated by the control information corresponding to the to-be-displayed picture frame is lower than a first screen ideal brightness, wherein the first screen ideal brightness is a preset brightness threshold that triggers the first electronic device to perform the dimming mode switching, and wherein the dimming mode switching comprises switching from a pulse width modulation (PWM) mode to a direct current (DC) mode or switching from the DC mode to the PWM mode; and when displaying the to-be-displayed picture frame, adjusting, by the first electronic device, the screen brightness of the first electronic device to the screen brightness indicated by the control information corresponding to the to-be-displayed picture frame;

wherein the obtaining the control information corresponding to the to-be-displayed picture frame comprises: obtaining the control information corresponding to the to-be-displayed picture frame from M pre-stored screen brightness parameters, wherein each screen brightness parameter of the M pre-stored screen brightness parameters comprises control information corresponding to one picture frame, and the to-be-displayed picture frame is a picture frame in the M screen brightness parameters;

wherein the M pre-stored screen brightness parameters are one group of a plurality of groups of screen brightness parameters, and one group of the screen brightness parameters corresponds to one screen refresh rate; and wherein the M pre-stored screen brightness parameters are a group of screen brightness parameters corresponding to a current screen refresh rate of the first electronic device.

17. The screen brightness adjustment method according to claim 16, wherein the M pre-stored screen brightness parameters comprise a plurality of first screen brightness parameters and at least one second screen brightness parameter, each first screen brightness parameter of the plurality of first screen brightness parameters comprises first control information corresponding to a first picture frame, and each second screen brightness parameter of the at least one second screen brightness parameter comprises second control information corresponding to a second picture frame;

wherein the first control information is obtained by calculating a second screen ideal brightness and a second screen actual brightness of a second electronic device when the dimming mode switching occurs, the second screen ideal brightness is a preset brightness threshold that triggers the second electronic device to perform the dimming mode switching, and the second screen actual brightness is an actual brightness value obtained when the second electronic device displays the first picture frame;

wherein a screen brightness indicated by the first control information in each first screen brightness parameter of the plurality of first screen brightness parameters is obtained based on a difference between the second screen ideal brightness and a second screen jump brightness, and the second screen jump brightness is a difference between the second screen actual brightness and the second screen ideal brightness; and wherein screen brightness indicated by the second control information in each second screen brightness parameter of the at least one second screen brightness parameter is obtained by performing interpolation calculation based on two pieces of adjacent adjustment brightness of the second picture frame, and the adjacent adjustment brightness is a screen brightness indicated by first control information corresponding to a first picture frame that is adjacent to the second picture frame and that is in the plurality of first screen brightness parameters.

18. The screen brightness adjustment method according to claim 16, wherein the screen brightness parameter comprises a frame sequence number and control information, wherein the frame sequence number is used to indicate a sequence number of the picture frame output after the first electronic device detects the dimming mode switching, wherein the control information is used to indicate screen brightness of the first electronic device when the first electronic device displays a picture frame corresponding to the frame sequence number, wherein a frame sequence number of the to-be-displayed picture frame is k, and wherein the control information corresponding to the to-be-displayed picture frame is control information corresponding to the frame sequence number k; and wherein the adjusting the screen brightness of the first electronic device to the screen brightness indicated by the control information corresponding to the to-be-displayed picture frame comprises:

adjusting the screen brightness of the first electronic device to the screen brightness indicated by the control information corresponding to the frame sequence number k.

19. The screen brightness adjustment method according to claim 16, wherein when detecting that the dimming mode switching occurs, the first electronic device obtains the control information corresponding to the to-be-displayed picture frame, wherein k is sequentially 1, 2, . . . , and M.

* * * * *